United States Patent
Aiba et al.

(10) Patent No.: US 10,645,602 B2
(45) Date of Patent: May 5, 2020

(54) TERMINAL DEVICE, BASE STATION DEVICE, COMMUNICATION METHOD, AND INTEGRATED CIRCUIT

(71) Applicant: Sharp Kabushiki Kaisha, Sakai, Osaka (JP)

(72) Inventors: Tatsushi Aiba, Sakai (JP); Shoichi Suzuki, Sakai (JP); Kazunari Yokomakura, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/563,959

(22) PCT Filed: Apr. 5, 2016

(86) PCT No.: PCT/JP2016/061164
§ 371 (c)(1),
(2) Date: Oct. 3, 2017

(87) PCT Pub. No.: WO2016/163369
PCT Pub. Date: Oct. 13, 2016

(65) Prior Publication Data
US 2018/0139639 A1 May 17, 2018

(30) Foreign Application Priority Data

Apr. 10, 2015 (JP) .................................. 2015-080508

(51) Int. Cl.
*H04W 24/10* (2009.01)
*H04L 5/00* (2006.01)
*H04W 72/04* (2009.01)

(52) U.S. Cl.
CPC ........... *H04W 24/10* (2013.01); *H04L 5/0053* (2013.01); *H04L 5/0057* (2013.01);
(Continued)

(58) Field of Classification Search
CPC ............... H04W 24/10; H04W 72/042; H04W 72/0453; H04L 5/00; H04L 5/0094; H04L 5/0057; H04L 5/0023; H04L 5/006
See application file for complete search history.

(56) References Cited

U.S. PATENT DOCUMENTS 8,259,651 B2 * 9/2012 Zhang .................... H04L 1/0026
370/328
8,526,519 B2 * 9/2013 Chen .................. H04L 25/03343
375/260

(Continued)

OTHER PUBLICATIONS

Official Communication issued in International Patent Application No. PCT/JP2016/061164, dated Jun. 21, 2016.
(Continued)

*Primary Examiner* — Brian T O Connor
(74) *Attorney, Agent, or Firm* — Keating & Bennett, LLP

(57) ABSTRACT

To include a reception unit and a transmission unit, in which the reception unit receives higher layer signaling including information to be used to configure a first set of one or more serving cells, and information to be used to configure a first reporting mode, receives higher layer signaling including information to be used to configure a second set of one or more serving cells, and information to be used to configure a second reporting mode, and receives a DCI format including a CSI request on a PDCCH, and the transmission unit transmits CSI for the first set on a PUSCH by using the first reporting mode in a case that a first value is set in a field of the CSI request, and transmits CSI for the second set on the PUSCH by using the second reporting mode in a case that a second value is set in the field of the CSI request.

8 Claims, 8 Drawing Sheets

Example 1

(52) U.S. Cl.
CPC ......... *H04L 5/0094* (2013.01); *H04W 72/042* (2013.01); *H04L 5/006* (2013.01); *H04L 5/0023* (2013.01); *H04L 5/0046* (2013.01); *H04W 72/0453* (2013.01)

(56) References Cited

U.S. PATENT DOCUMENTS

| | | | | |
|---|---|---|---|---|
| 9,178,583 | B2* | 11/2015 | Nam | H04B 7/0417 |
| 9,788,226 | B2* | 10/2017 | Yi | H04L 5/0057 |
| 9,883,491 | B2* | 1/2018 | Davydov | H04L 5/0007 |
| 9,923,699 | B2* | 3/2018 | Li | H04L 5/0057 |
| 9,929,902 | B2* | 3/2018 | Blankenship | H04B 7/0632 |
| 9,986,562 | B2* | 5/2018 | Zhu | H04L 5/001 |
| 9,998,194 | B2* | 6/2018 | Guo | H04L 1/0026 |
| 10,003,448 | B2* | 6/2018 | Lee | H04L 5/0048 |
| 10,014,911 | B2* | 7/2018 | Marinier | H04B 7/024 |
| 10,439,692 | B2* | 10/2019 | Kim | H04B 7/0639 |
| 2016/0174201 | A1* | 6/2016 | Zhang | H04W 24/10 370/329 |

OTHER PUBLICATIONS

"Correction to Discovery in Small Cell Enhancement feature", 3GPP TSG RAN WG1 Meeting #80, R1-150957, Feb. 9-13, 2015, 12 pages.

Nokia Corporation et al., "New WI proposal: LTE Carrier Aggregation Enhancement Beyond 5 Carriers", 3GPP TSG RAN Meeting #66, RP-142286, Dec. 8-11, 2014, 9 pages.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.4.1, Dec. 2014, pp. 1-410.

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.4.0, Dec. 2014, pp. 1-60.

"3rd Generation Partnership Project; Technical Specification Group Radio Access Network; Evolved Universal Terrestrial Radio Access (E-UTRA); Physical layer procedures (Release 12)", 3GPP TS 36.213 V12.4.0, Dec. 2014, pp. 1-225.

"3rd Generation Partnership Project; Technical Specification Group Radio Access Network; Evolved Universal Terrestrial Radio Access (E-UTRA); Multiplexing and channel coding (Release 12)", 3GPP TS 36.212 V12.3.0, Dec. 2014, pp. 1-89.

"3rd Generation Partnership Project; Technical Specification Group Radio Access Network; Evolved Universal Terrestrial Radio Access (E-UTRA); Physical channels and modulation (Release 12)", 3GPP TS 36.211 V12.4.0, Dec. 2014, pp. 1-124.

* cited by examiner

FIG. 3A Example 1
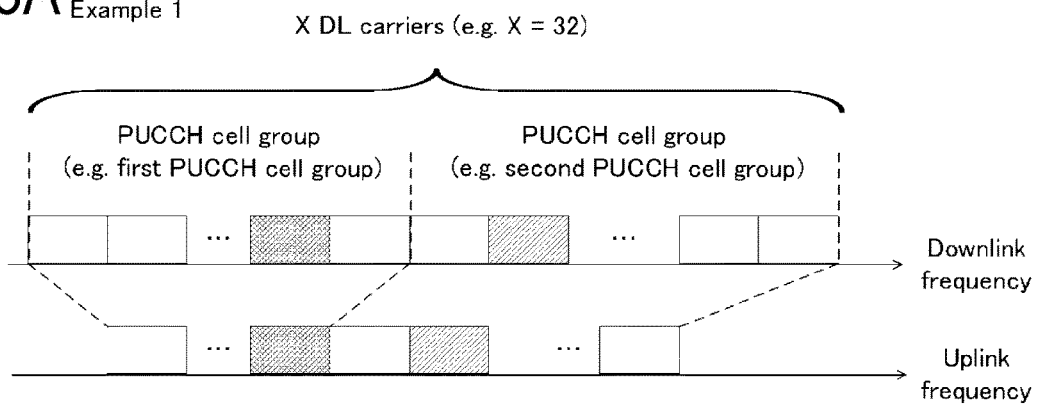
FIG. 3B Example 2
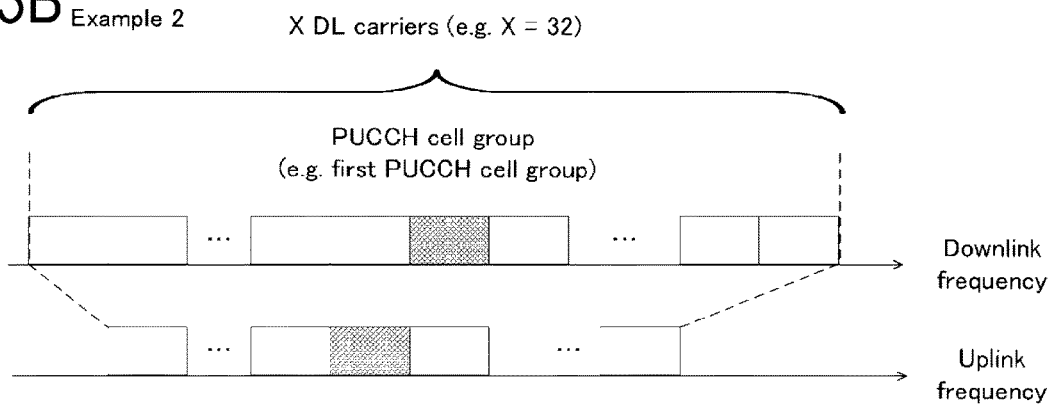
FIG. 3C Example 3
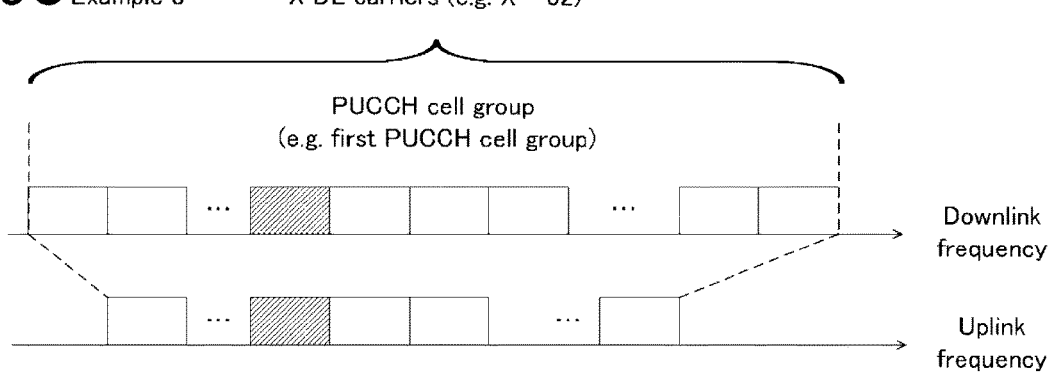

FIG. 4A
2-bit CSI Request field for PDCCH with uplink DCI format in UE-specific search space

| Value of CSI request field | Description |
|---|---|
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

FIG. 4B
3-bit CSI Request field for PDCCH with uplink DCI format in UE-specific search space

| Value of CSI request field | Description |
|---|---|
| '000' | No aperiodic CSI report is triggered |
| '001' | Aperiodic CSI report is triggered for serving cell c |
| '010' | Aperiodic CSI report is triggered for a $1^{st}$ set of serving cells configured by higher layers |
| '011' | Aperiodic CSI report is triggered for a $2^{nd}$ set of serving cells configured by higher layers |
| '100' | Aperiodic CSI report is triggered for a $3^{rd}$ set of serving cells configured by higher layers |
| '101' | Aperiodic CSI report is triggered for a $4^{th}$ set of serving cells configured by higher layers |
| '110' | Aperiodic CSI report is triggered for a $5^{th}$ set of serving cells configured by higher layers |
| '111' | Aperiodic CSI report is triggered for a $6^{th}$ set of serving cells configured by higher layers |

FIG. 5A  2-bit CSI Request field for PDCCH with uplink DCI format

| Value of CSI request field | Description |
| --- | --- |
| '00' | No aperiodic CSI report is triggered |
| '01' | Aperiodic CSI report is triggered for serving cell c |
| '10' | Aperiodic CSI report is triggered for a 1st set of serving cells configured by higher layers, 1st reporting mode configured by higher layers |
| '11' | Aperiodic CSI report is triggered for a 2nd set of serving cells configured by higher layers, 2nd reporting mode configured by higher layers |

FIG. 5B  3-bit CSI Request field for PDCCH with uplink DCI format

| Value of CSI request field | Description |
| --- | --- |
| '000' | No aperiodic CSI report is triggered |
| '001' | Aperiodic CSI report is triggered for serving cell c, |
| '010' | Aperiodic CSI report is triggered for a 1st set of serving cells configured by higher layers, 1st reporting mode configured by higher layers |
| '011' | Aperiodic CSI report is triggered for a 2nd set of serving cells configured by higher layers, 2nd reporting mode configured by higher layers |
| '100' | Aperiodic CSI report is triggered for a 3rd set of serving cells configured by higher layers, 3rd reporting mode configured by higher layers |
| '101' | Aperiodic CSI report is triggered for a 4th set of serving cells configured by higher layers, 4th reporting mode configured by higher layers |
| '110' | Aperiodic CSI report is triggered for a 5th set of serving cells configured by higher layers, 5th reporting mode configured by higher layers |
| '111' | Aperiodic CSI report is triggered for a 6th set of serving cells configured by higher layers, 6th reporting mode configured by higher layers |

CQI and PMI Feedback Types for PUSCH CSI reporting Modes

| PUSCH CQI Feedback Type | PMI Feedback Type | | | |
|---|---|---|---|---|
| | | No PMI | Single PMI | Multiple PMI |
| | Wideband (wideband CQI) | Mode 1-0 | Mode 1-1 | Mode 1-2 |
| | UE Selected (subband CQI) | Mode 2-0 | | Mode 2-2 |
| | Higher Layer configured (subband CQI) | Mode 3-0 | Mode 3-1 | Mode 3-2 |

FIG. 6

TERMINAL DEVICE, BASE STATION DEVICE, COMMUNICATION METHOD, AND INTEGRATED CIRCUIT

TECHNICAL FIELD

The present invention relates to a terminal device, a base station device, a communication method, and an integrated circuit.

This application claims priority based on JP 2015-080508 filed on Apr. 10, 2015, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)", or "Evolved Universal Terrestrial Radio Access (EUTRA)") have been considered (NPL 1, NPL 2, NPL 3, NPL 4, and NPL 5). In LTE, a base station device is also referred to as an evolved NodeB (eNodeB), and a terminal device is also referred to as user equipment (UE). LTE is a cellular communication system in which an area is divided into multiple cells to form a cellular pattern, each of the cells being served by a base station device. In such a cellular communication system, a single base station device may manage multiple cells.

LTE supports a time division duplex (TDD). LTE that employs a TDD scheme is also referred to as TD-LTE or LTE TDD. In TDD, uplink signals and downlink signals are time division multiplexed. Furthermore, LTE supports a frequency division duplex (FDD).

In 3GPP, career aggregation has been specified which allows a terminal device to perform simultaneous transmission and/or reception in up to five serving cells (component careers).

In addition, in 3GPP, a configuration where a terminal device performs simultaneous transmission and/or reception in more than five serving cells (component careers) has been considered (NPL 1). Furthermore, a configuration where a terminal device transmits a physical uplink control channel in a secondary cell which is a serving cell other than a primary cell has been considered (NPL 6).

CITATION LIST

Non Patent Literature

NPL 1: "3GPP TS 36.211 V12.4.0 (2014-12) Evolved Universal Terrestrial Radio Access (E-UTRA); Physical channels and modulation (Release 12)", 6 Jan. 2015.
NPL 2: "3GPP TS 36.212 V12.3.0 (2014-12) Evolved Universal Terrestrial Radio Access (E-UTRA); Multiplexing and channel coding (Release 12)", 6 Jan. 2015.
NPL 3: "3GPP TS 36.213 V12.4.0 (2014-12) Evolved Universal Terrestrial Radio Access (E-UTRA); Physical layer procedures (Release 12)", 7 Jan. 2015.
NPL 4: "3GPP TS 36.321 V12.4.0 (2014-12) Evolved Universal Terrestrial Radio Access (E-UTRA); Medium Access Control (MAC) protocol specification (Release 12)", 5 Jan. 2015.
NPL 5: "3GPP TS 36.331 V12.4.1 (2014-12) Evolved Universal Terrestrial Radio Access (E-UTRA); Radio Resource Control (RRC); Protocol specification (Release 12)", 7 Jan. 2015.
NPL 6: "New WI proposal: LTE Carrier Aggregation Enhancement Beyond 5 Carriers", RP-142286, Nokia Corporation, NTT DoCoMo Inc., Nokia Networks, 3GPP TSG RAN Meeting #66, Hawaii, United States of America, 8-11 Dec. 2014.

SUMMARY OF INVENTION

Technical Problem

However, for the radio communication system as described above, a concrete method when transmitting uplink control information has not been sufficiently discussed.

Some aspects of the present invention have been made in light of the foregoing, and an object of the present invention is to provide a terminal device, a base station device, a communication method, and an integrated circuit, which enable efficient transmission of uplink control information.

Solution to Problem (1) In order to accomplish the above-described object, some aspects of the present invention are contrived to provide the following means. A terminal device according to an aspect of the present invention is a terminal device including a reception unit receiving higher layer signaling including information to be used to configure a first set of one or more serving cells, and information to be used to configure a first reporting mode, receiving higher layer signaling including information to be used to configure a second set of one or more serving cells, and information to be used to configure a second reporting mode, and receiving a DCI format including a CSI request on a PDCCH, and a transmission unit transmitting CSI for the first set on a PUSCH by using the first reporting mode in a case that a first value is set in a field of the CSI request, and transmitting CSI for the second set on the PUSCH by using the second reporting mode in a case that a second value is set in the field of the CSI request.

(2) A base station device according to an aspect of the present invention is a base station device including a transmission unit transmitting higher layer signaling including information to be used to configure a first set of one or more serving cells, and information to be used to configure a first reporting mode, transmitting higher layer signaling including information to be used to configure a second set of one or more serving cells, and information to be used to configure a second reporting mode, and transmitting a DCI format including a CSI request on a PDCCH, and a reception unit receiving CSI for the first set on a PUSCH by using the first reporting mode in a case that a first value is set in a field of the CSI request, and receiving CSI for the second set on the PUSCH by using the second reporting mode in a case that a second value is set in the field of the CSI request.

(3) A communication method according to an aspect of the present invention is a communication method of a terminal device, the communication method including receiving higher layer signaling including information to be used to configure a first set of one or more serving cells, and information to be used to configure a first reporting mode, receiving higher layer signaling including information to be used to configure a second set of one or more serving cells, and information to be used to configure a second reporting mode, receiving a DCI format including a CSI request on a PDCCH, transmitting CSI for the first set on a PUSCH by using the first reporting mode in a case that a first value is set in a field of the CSI request, and transmitting CSI for the second set on the PUSCH by using the second reporting mode in a case that a second value is set in the field of the CSI request.

(4) A communication method according to an aspect of the present invention is a communication method of a base station device, the communication method including transmitting higher layer signaling including information to be used to configure a first set of one or more serving cells, and information to be used to configure a first reporting mode, transmitting higher layer signaling including information to be used to configure a second set of one or more serving cells, and information to be used to configure a second reporting mode, transmitting a DCI format including a CSI request on a PDCCH, receiving CSI for the first set on a PUSCH by using the first reporting mode in a case that a first value is set in a field of the CSI request, and receiving CSI for the second set on the PUSCH by using the second reporting mode in a case that a second value is set in the field of the CSI request.

(5) A communication method according to an aspect of the present invention is an integrated circuit mounted on a terminal device, causing the terminal device to exert a function to receive higher layer signaling including information to be used to configure a first set of one or more serving cells, and information to be used to configure a first reporting mode, receive higher layer signaling including information to be used to configure a second set of one or more serving cells, and information to be used to configure a second reporting mode, and receive a DCI format including a CSI request on a PDCCH, and a function to transmit CSI for the first set on a PUSCH by using the first reporting mode in a case that a first value is set in a field of the CSI request, and transmit CSI for the second set on the PUSCH by using the second reporting mode in a case that a second value is set in the field of the CSI request.

(6) A communication method according to an aspect of the present invention is an integrated circuit mounted on a base station device, causing the base station device to exert a function to transmit higher layer signaling including information to be used to configure a first set of one or more serving cells, and information to be used to configure a first reporting mode, transmit higher layer signaling including information to be used to configure a second set of one or more serving cells, and information to be used to configure a second reporting mode, and transmit a DCI format including a CSI request on a PDCCH, and a function to receive CSI for the first set on a PUSCH by using the first reporting mode in a case that a first value is set in a field of the CSI request, and receive CSI for the second set on the PUSCH by using the second reporting mode in a case that a second value is set in the field of the CSI request.

Advantageous Effects of Invention

According to some aspects of the present invention, uplink control information can be transmitted efficiently.

BRIEF DESCRIPTION OF DRAWINGS

FIGS. 3A to 3C are diagrams illustrating PUCCH cell groups according to the present embodiment.

FIGS. 4A and 4B are diagrams for illustrating an aperiodic CSI report according to the present embodiment.

FIGS. 5A and 5B are other diagrams for illustrating an aperiodic CSI report according to the present embodiment.

FIG. 6 is a diagram illustrating a reporting mode according to the present embodiment.

DESCRIPTION OF EMBODIMENTS

Embodiments of the present invention will be described below.

Figure 1:
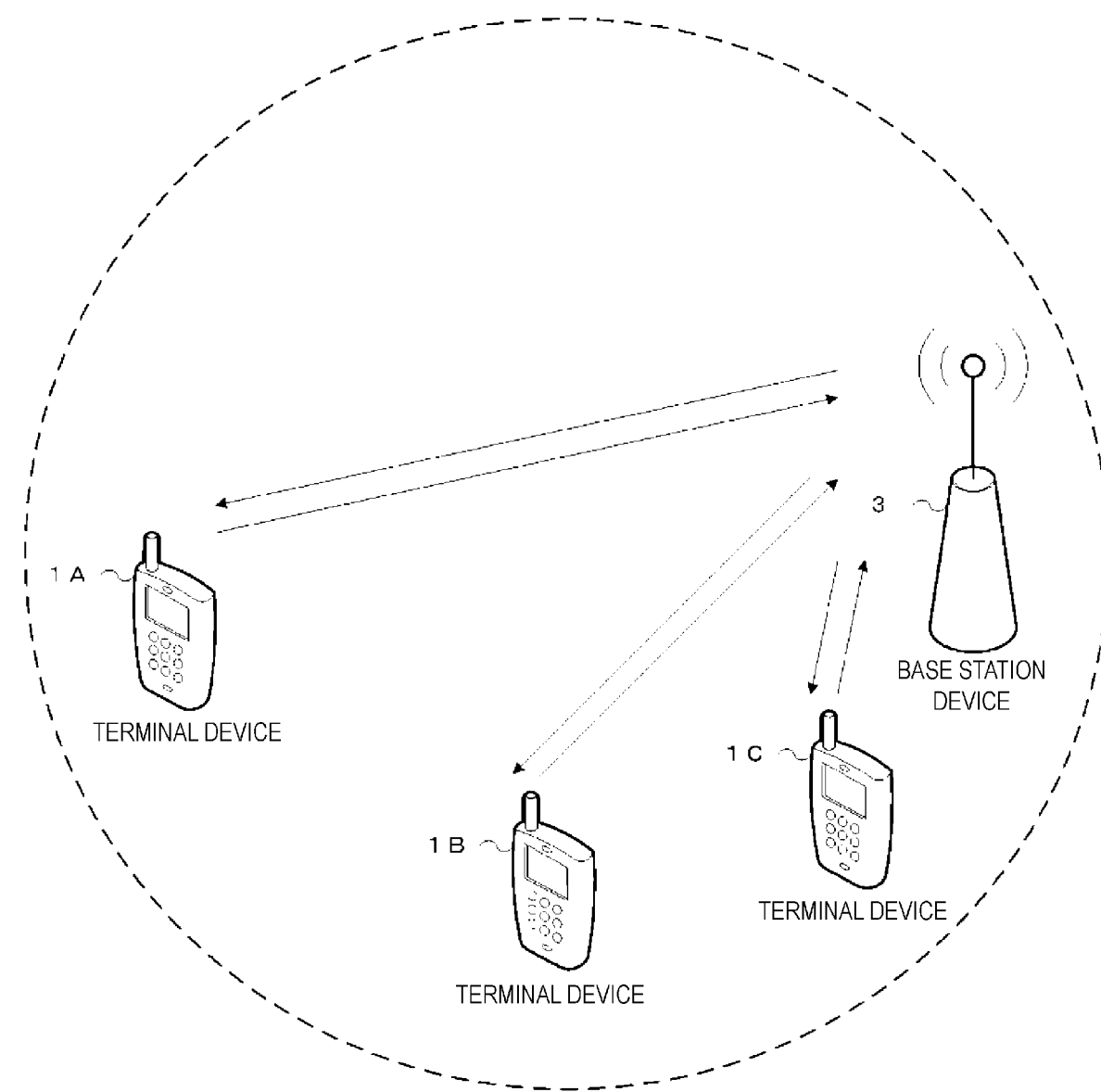
FIG. 1 is a diagram illustrating a concept of a radio communication system according to the present embodiment.

FIG. 1 is a conceptual diagram of a radio communication system according to the present embodiment. In FIG. 1, the radio communication system includes terminal devices 1A to 1C and a base station device 3. Hereinafter, the terminal devices 1A to 1C are each also referred to as a terminal device 1.

Physical channels and physical signals according to the present embodiment will be described.

In FIG. 1, in uplink radio communication from the terminal device 1 to the base station device 3, the following uplink physical channels are used. Here, the uplink physical channels are used to transmit information output from higher layers.

Physical uplink control channel (PUCCH)
Physical uplink shared channel (PUSCH)
Physical random access channel (PRACH)

The PUCCH is used to transmit uplink control information (UCI). Here, the uplink control information may include channel state information (CSI) used to indicate a downlink channel state. Here, the CSI may consist of channel quality indicator (CQI), preceding matrix indicator (PMI), and/or, rank indication (RI).

The uplink control information may include scheduling request (SR) used to request an UL-SCH resource. The uplink control information may include hybrid automatic repeat request acknowledgement (HARQ-ACK). HARQ-ACK may indicate HARQ-ACK for downlink data (transport block, medium access control protocol data unit (MAC PDU), downlink-shared channel (DL-SCH), or physical downlink shared channel (PDSCH)).

In other words, HARQ-ACK may indicate acknowledgement (ACK) or negative-acknowledgement (NACK). Here, HARQ-ACK may also be referred to as ACK/NACK, HARQ feedback, HARQ acknowledgement, HARQ information, or HARQ control information.

The PUSCH is used to transmit uplink data (uplink-shared channel (UL-SCH)). Furthermore, the PUSCH may be used to transmit HARQ-ACK and/or CSI along with the uplink data. Furthermore, the PUSCH may be used to transmit CSI only or HARQ-ACK and CSI only. In other words, the PUSCH may be used to transmit the uplink control information only.

Here, the base station device 3 and the terminal device 1 exchange (transmit and receive) signals with each other in the higher layers. For example, the base station device 3 and the terminal device 1 may transmit and receive radio resource control (RRC) signaling (also referred to as RRC message or RRC information) to and from each other in an RRC layer. The base station device 3 and the terminal device 1 may transmit and receive a medium access control (MAC)

element to and from each other in a MAC layer. Here, the RRC signaling and/or the MAC control element is also referred to as higher layer signaling.

The PUSCH may be used to transmit the RRC signaling and the MAC control element. Here, the RRC signaling transmitted from the base station device 3 may be signaling common to multiple terminal devices 1 in a cell. The RRC signaling transmitted from the base station device 3 may be signaling dedicated to a certain terminal device 1 (also referred to as dedicated signaling). In other words, user-equipment-specific information (information unique to user equipment) may be transmitted through signaling dedicated to the certain terminal device 1.

The PRACH is used to transmit a random access preamble. The PRACH may be used for an initial connection establishment procedure, a handover procedure, a connection re-establishment procedure, uplink transmission synchronization (timing adjustment), and indicating a PUSCH resource request.

In FIG. 1, the following uplink physical signal is used in the uplink radio communication. Here, the uplink physical signal is not used to transmit information output from the higher layers but is used by a physical layer.

Uplink reference signal (UL RS)

According to the present embodiment, the following two types of uplink reference signals are used.

Demodulation reference signal (DMRS)
Sounding reference signal (SRS)

The DMRS is associated with transmission of the PUSCH or the PUCCH. The DMRS is time-multiplexed with the PUSCH or the PUCCH. The base station device 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS is not associated with the transmission of the PUSCH or the PUCCH. The base station device 3 uses the SRS in order to measure an uplink channel state.

In FIG. 1, the following downlink physical channels are used for downlink radio communication from the base station device 3 to the terminal device 1. Here, the downlink physical channels are used to transmit the information output from the higher layers.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)
Physical multicast channel (PMCH)

The PBCH is used to broadcast a master information block (MIB), or a broadcast channel (BCH), that is shared by the terminal devices 1.

The PCFICH is used to transmit information indicating a region (OFDM symbols) to be used for transmission of the PDCCH.

The PHICH is used to transmit a HARQ indicator (HARQ feedback or acknowledgement information) indicating acknowledgement (ACK) or negative acknowledgement (NACK) with respect to the uplink data (uplink shared channel (UL-SCH)) received by the base station device 3.

The PDCCH and the EPDCCH are used to transmit downlink control information (DCI). Here, multiple DCI formats are defined for transmission of the downlink control information. In other words, a field for the downlink control information is defined in a DCI format and is mapped to information bits.

For example, DCI formats for downlink (for example, DCI format 1A and DCI format 1C) to be used for the scheduling of one PDSCH in one cell (transmission of a single downlink transport block) may be defined.

Here, each of the downlink DCI formats includes information on the scheduling of the PDSCH. For example, the downlink DCI format includes downlink control information such as a carrier indicator field (CIF), information on resource block assignment, or information on a modulation and coding scheme (MCS). Here, the downlink DCI format is also referred to as downlink grant or downlink assignment.

Furthermore, for example, DCI formats for uplink (for example, DCI format 0 and DCI format 4) to be used for the scheduling of one PUSCH in one cell (transmission of a single uplink transport block) are defined.

Here, each of the uplink DCI formats includes information on the scheduling of the PUSCH. For example, the uplink DCI format includes downlink control information such as a carrier indicator field (CIF), information on resource block assignment and/or hopping resource allocation, information on modulation and coding scheme (MCS) and/or redundancy version, or information used for indicating the number of transmission layers (precoding information and the number of layers). Here, the uplink DCI format is also referred to as uplink grant or uplink assignment.

In a case that a PDSCH resource is scheduled in accordance with the downlink assignment, the terminal device 1 may receive downlink data on the scheduled PDSCH. In a case that a PUSCH resource is scheduled in accordance with the uplink grant, the terminal device 1 may transmit uplink data and/or uplink control information on the scheduled PUSCH.

Here, the terminal device 1 may monitor a set of PDCCH candidates and/or EPDCCH candidates. The PDCCH may indicate a PDCCH and/or an EPDDCH below. Here, the PDCCH candidates are candidates which the PDCCH may be mapped to and/or transmitted on by the base station device 3. Furthermore "monitor" may include the meaning that the terminal device 1 attempts to decode each PDCCH in the set of PDCCH candidates in accordance with each of all the monitored DCI formats.

The set of PDCCH candidates to be monitored by the terminal device 1 is also referred to as a search space. The search space may include a common search space (CSS). For example, the common search space may be defined as a space common to multiple terminal devices 1. The search space may include a UE-specific search space (USS). For example, the UE-specific search space may be defined at least on the basis of a C-RNTI assigned to the terminal device 1. The terminal device 1 may monitor PDCCHs in CSS/or USS to detect a PDCCH destined for the terminal device 1 itself.

Here, an RNTI assigned to the terminal device 1 by the base station device 3 is used for the transmission of downlink control information (transmission on the PDCCH). Specifically, cyclic redundancy check (CRC) parity bits are attached to a DCI format (or downlink control information), and after the attachment, the CRC parity bits are scrambled with the RNTI. Here, the CRC parity bits attached to the DCI format may be obtained from the payload of the DCI format.

The terminal device 1 attempts to decode the DCI format to which the CRC parity bits scrambled with the RNTI have been attached, and detects, as a DCI format destined for the terminal device 1 itself, the DCI format for which the CRC has been successful (also referred to as blind coding). In other words, the terminal device 1 may detect the PDCCH with CRC scrambled with the RNTI. The terminal device 1 may detect the PDCCH including the DCI format to which the CRC parity bits scrambled with the RNTI have been attached.

Here, the RNTI may include a cell-radio network temporary identifier (C-RNTI). The C-RNTI is an identifier unique to the terminal device 1 and used for the identification in RRC connection and scheduling. The C-RNTI may be used for dynamically scheduled unicast transmission.

The RNTI may further include a semi-persistent scheduling C-RNTI (SPS C-RNTI). The SPS C-RNTI is an identifier unique to the terminal device 1 and used for semi-persistent scheduling. The SPS C-RNTI may be used for semi-persistently scheduled unicast transmission.

The PDSCH is used to transmit downlink data (downlink shared channel (DL-SCH)). The PDSCH is used to transmit a system information message. Here, the system information message may be cell-specific information (information unique to a cell). The system information is included in RRC signaling. The PDSCH is used to transmit the RRC signaling and the MAC control element.

The PMCH is used to transmit multicast data (multicast channel (MCH)).

In FIG. 1, the following downlink physical signals are used in the downlink radio communication. Here, the downlink physical signals are not used to transmit the information output from the higher layers but is used by the physical layer.

Synchronization signal (SS)
   Downlink reference signal (DL RS)

The synchronization signal is used in order for the terminal device 1 to be synchronized in terms of frequency and time domains for downlink. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used in order for the terminal device 1 to perform the channel compensation of the downlink physical channel. The downlink reference signal is used in order for the terminal device 1 to obtain the downlink channel state information.

According to the present embodiment, the following five types of downlink reference signals are used.

Cell-specific reference signal (CRS)
   UE-specific reference signal (URS) associated with the PDSCH
   Demodulation reference signal (DMRS) associated with the EPDCCH
   Non-zero power channel state information-reference signal (NZP CSI-RS)
   Zero power channel state information-reference signal (ZP CSI-RS)
   Multimedia broadcast and multicast service over single frequency network reference signal (MBSFN RS)
   Positioning reference signal (PRS)

Here, the downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The BCH, the MCH, the UL-SCH, and the DL-SCH are transport channels. A channel used in a medium access control (MAC) layer is referred to as a transport channel. The unit of the transport channel used in the MAC layer is also referred to as a transport block (TB) or a MAC protocol data unit (PDU). Control of a hybrid automatic repeat request (HARM) is performed on each transport block in the MAC layer. The transport block is a unit of data that the MAC layer delivers to the physical layer. In the physical layer, the transport block is mapped to a codeword and subject to coding processing on a codeword-by-codeword basis.

Carrier aggregation will be described below.

In the present embodiment, one or multiple serving cells may be configured for the terminal device 1. A technology in which the terminal device 1 communicates via multiple serving cells is referred to as cell aggregation or carrier aggregation.

Here, the present embodiment may apply to one or each of the multiple serving cells configured for the terminal device 1. Alternatively, the present embodiment may apply to one or some of the multiple serving cells configured for the terminal device 1. Alternatively, the present embodiment may apply to one or each of the multiple serving cell groups (for example, PUCCH cell groups) configured for the terminal device 1, which will be described later. Alternatively, the present embodiment may apply to one or some of the multiple serving cell groups configured for the terminal device 1.

In the present embodiment, time division duplex (TDD) and/or frequency division duplex (FDD) may be applied. Here, for carrier aggregation, TDD or FDD may apply to one or all of the multiple serving cells. Alternatively, serving cells to which TDD applies and serving cells to which FDD applies may be aggregated. Here, a frame structure for FDD is also referred to as frame structure type 1. A frame structure for TDD is referred to as frame structure type 2.

Here, the one or multiple configured serving cells include one primary cell and one or multiple secondary cells. The primary cell may be a serving cell in which an initial connection establishment procedure has been performed, a serving cell in which a connection re-establishment procedure has been initiated, or a cell designated as a primary cell during a handover procedure. Here, upon an RRC connection being established or later, a secondary cell(s) may be configured.

Here, a carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal device 1 may simultaneously perform transmission and/or reception on multiple physical channels in one or multiple serving cells (component carrier(s)). Here, transmission of one physical channel may be performed in one serving cell (component carrier) of the multiple serving cells (component carriers).

Here, the primary cell is used for the transmission on the PUCCH. The primary cell cannot be deactivated. The cross-carrier scheduling does not apply to the primary cell. In other words, the primary cell is always scheduled via its PDCCH.

In a case that PDCCH (PDCCH monitoring) of a secondary cell is configured, cross-carries scheduling may not apply this secondary cell. To be more specific, in this case, the secondary cell may always be scheduled via its PDCCH. In a case that no PDCCH (PDCCH monitoring) of a secondary cell is configured, cross-carrier scheduling applies to the secondary cell, and the secondary cell may always be scheduled via the PDCCH in one other serving cell.

Here, in the present embodiment, a secondary cell used for transmission on the PUCCH is referred to as a PUCCH secondary cell or a special secondary cell. In the present embodiment, a secondary cell not used to transmit a PUCCH is referred to as a non-PUCCH secondary cell, a non-special secondary cell, a non-PUCCH serving cell, or a non-PUCCH cell. The primary cell and the PUCCH secondary cell are collectively referred to as a PUCCH serving cell or a PUCCH cell.

Here, the PUCCH serving cell (the primary cell or the PUCCH secondary cell) always includes a downlink component carrier and an uplink component carrier. In the PUCCH serving cell (the primary cell or the PUCCH secondary cell), PUCCH resources are configured.

The non-PUCCH serving cell (the non-PUCCH secondary cell) may include a downlink component carrier only. Alternatively, the non-PUCCH serving cell (the non-PUCCH secondary cell) may include a downlink component carrier and an uplink component carrier.

The terminal device 1 performs transmission on the PUCCH in the PUCCH serving cell. To be more specific, the terminal device 1 performs transmission on the PUCCH in the primary cell. Moreover, the terminal device 1 performs transmission on the PUCCH in the PUCCH secondary cell. Moreover, the terminal device 1 does not perform transmission on the PUCCH in the non-special secondary cell.

Here, the PUCCH secondary cell may be defined as a serving cell that is neither a primary cell nor a secondary cell.

Here, the base station device 3 may configure one or multiple serving cells through the higher layer signaling. For example, one or multiple secondary cells may be configured to form a set of multiple serving cells with a primary cell. Here, the serving cells configured by the base station device 3 may include a PUCCH secondary cell.

The base station device 3 may activate or deactivate one or multiple serving cells through the higher layer signaling (for example, a MAC control element). For example, the activation or deactivation mechanism may be based on a combination of the MAC control element and a deactivation timer.

Here, secondary cells activated or deactivated by the base station device 3 may include a PUCCH secondary cell. To be more specific, the base station device 3 may solely activate or deactivate multiple secondary cells including the PUCCH secondary cell through a single activation/deactivation command. In other words, the base station device 3 may transmit the single activation/deactivation command to be used to activate or deactivate secondary cells through the MAC control element.

As a value of the deactivation timer, a common value may be configured for each terminal device 1 by the higher layers (for example, the RRC layer). The deactivation timer (the value of the timer) may be maintained for (apply to) each of the secondary cells. Here, the deactivation timer (the value of the timer) may be maintained for each of the non-PUCCH secondary cells only. In other words, the terminal device 1 may maintain (apply) the deactivation timer for (to) each of the non-PUCCH secondary cells only, without applying the deactivation timer to the PUCCH secondary cells.

Alternatively, a deactivation timer for PUCCH secondary cells and a deactivation timer for non-PUCCH secondary cells may be configured separately. For example, the base station device 3 may transmit the higher layer signaling including the deactivation timer for the PUCCH secondary cells and information on the configuration of the deactivation timer. Moreover, the base station device 3 may transmit the higher layer signaling including the deactivation timer for the non-PUCCH secondary cells and information on the configuration of the deactivation timer.

To be more specific, the PUCCH secondary cell is used for the transmission on the PUCCH. The PUCCH secondary cell may not be deactivated.

Cross-carrier scheduling may not apply to PUCCH secondary cell. In other words, PUCCH secondary cell is always scheduled via its PDCCH. Here, cross-carrier scheduling may apply to PUCCH secondary cell. To be more specific, the PUCCH secondary cell may be scheduled via the PDCCH in another serving cell.

For example, in a case that PDCCH (PDCCH monitoring) of a PUCCH secondary cell is configured, cross-carries scheduling may not apply this PUCCH secondary cell. To be more specific, in this case, the PUCCH secondary cell may always be scheduled via its PDCCH. In a case that no PDCCH (PDCCH monitoring) of the PUCCH secondary cell is configured, cross-carrier scheduling applies to the PDCCH secondary cell, and the secondary cell may always be scheduled via the PDCCH in another serving cell.

Here, linking may be defined between the uplink (for example, the uplink component carrier) and the downlink (for example, the downlink component carrier). In other words, on the basis of the linking between the uplink and the downlink, the serving cell responsible for a downlink assignment (the serving cell in which transmission on the PDSCH scheduled in accordance with the downlink assignment (downlink transmission) is performed) may be identified. Moreover, on the basis of the linking between the uplink and the downlink, the serving cell responsible for an uplink grant (the serving cell in which transmission on the PUSCH scheduled in accordance with the uplink grant (uplink transmission) is performed) may be identified. Here, no carrier indicator field is present in the downlink assignment or the uplink.

In other words, the downlink assignment received in the primary cell may correspond to downlink transmission in the primary cell. Moreover, the uplink grant received in the primary cell may correspond to uplink transmission in the primary cell. The downlink assignment received in the PUCCH secondary cell may correspond to downlink transmission in the PUCCH secondary cell. Moreover, the uplink grant received in the PUCCH secondary cell may correspond to uplink transmission in the PUCCH secondary cell.

The downlink assignment received in a certain secondary cell (the PUCCH secondary cell and/or the non-PUCCH secondary cell) may correspond to downlink transmission in the certain secondary cell. Moreover, the uplink grant received in a certain secondary cell (the PUCCH secondary cell and/or the non-PUCCH secondary cell) may correspond to uplink transmission in the certain secondary cell.

A configuration of a slot according to the present embodiment will be described below.

Figure 2:
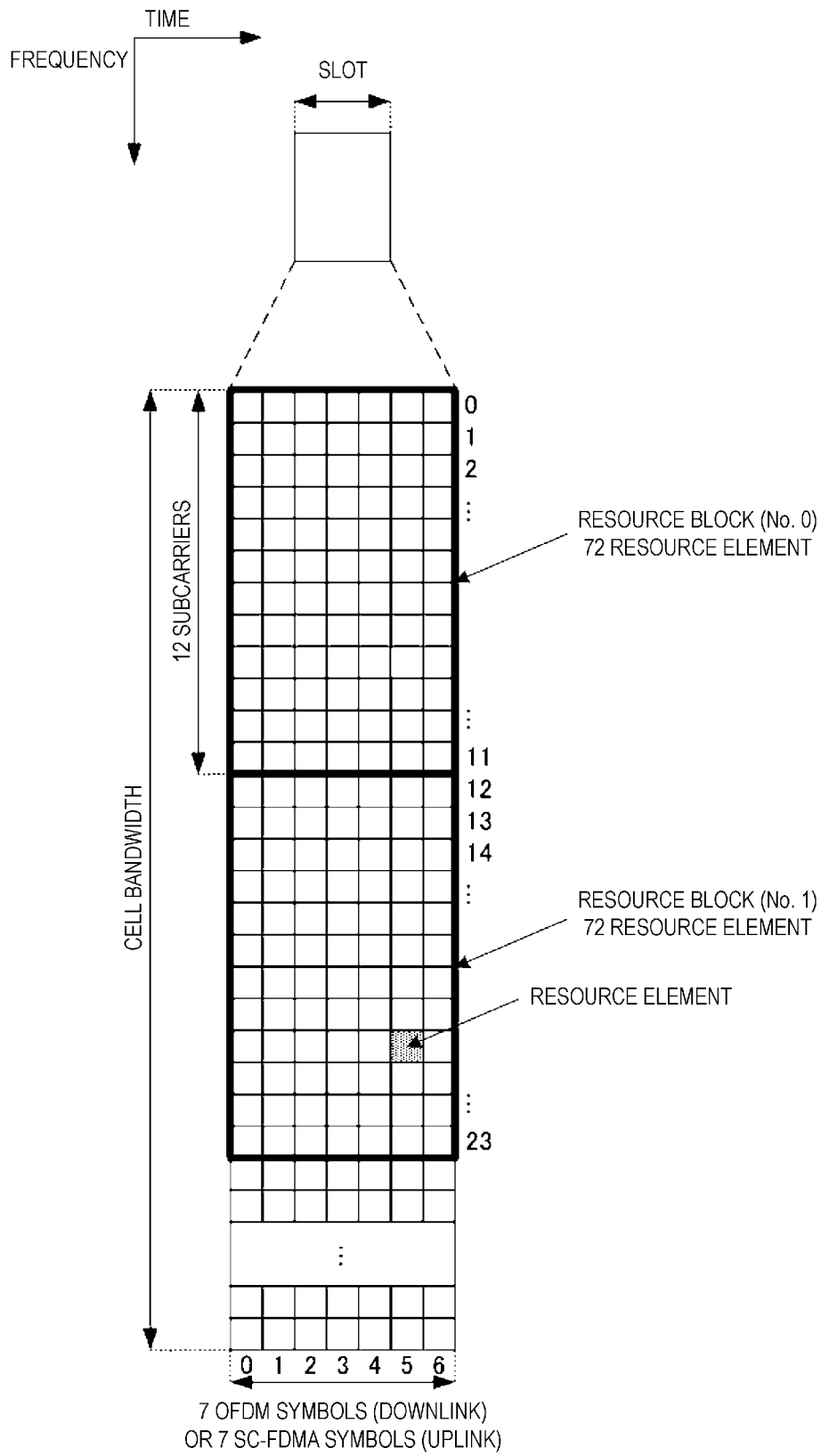
FIG. 2 is a diagram illustrating a configuration of a slot according to the present embodiment.

FIG. 2 is a diagram illustrating the configuration of the slot according to the present embodiment. In FIG. 2, the horizontal axis represents a time axis, and the vertical axis represents a frequency axis. Here, a normal cyclic prefix (CP) may apply to an OFDM symbol. Alternatively, an extended cyclic prefix (CP) may apply to the OFDM symbol. The physical signal or the physical channel transmitted in each of the slots is expressed by a resource grid.

Here, in the downlink, the resource grid may be defined with multiple subcarriers and multiple OFDM symbols. In the uplink, the resource grid may be defined with multiple subcarriers and multiple SC-FDMA symbols. The number of subcarriers constituting one slot may depend on a cell bandwidth. The number of OFDM symbols or SC-FDMA symbols constituting one slot may be seven. Here, each element within the resource grid is referred to as a resource element. The resource element may be identified by a subcarrier number and an OFDM symbol or SC-FDMA symbol number.

Here, a resource block may be used to express mapping of a certain physical channel (the PDSCH, the PUSCH, or the like) to resource elements. For the resource block, a virtual resource block and a physical resource block may be defined. A certain physical channel may be first mapped to the virtual resource block. Thereafter, the virtual resource block may be mapped to the physical resource block. One physical resource block may be defined with seven consecutive OFDM symbols or SC-FDMA symbols in the time domain and by 12 consecutive subcarriers in the frequency domain. Thus, one physical resource block may be constituted of (7×12) resource elements. Furthermore, one physical resource block may correspond to one slot in the time domain and correspond to 180 kHz in the frequency domain. The physical resource blocks may be numbered from zero in the frequency domain.

FIGS. 3A to 3C are diagrams illustrating PUCCH cell groups according to the present embodiment. In FIGS. 3A to 3C, three examples (Example (a), Example (b), and Example (c)) are provided as examples of a configuration (constitution or definition) of a PUCCH cell group. Here, in the present embodiment, a group of multiple serving cells is referred to as a PUCCH cell group. The PUCCH cell group may be a group associated with transmission on the PUCCH (transmission of uplink control information on the PUCCH). Here, a certain serving cell belongs to any one of PUCCH cell groups. Here, it goes without saying that the PUCCH cell group may be configured differently from the examples illustrated in FIGS. 3A to 3C.

Here, the base station device 3 and/or the terminal device 1 in the present embodiment may support carrier aggregation of up to 32 downlink component carriers (downlink cells), for example. In other words, the base station device 3 and the terminal device 1 can simultaneously perform transmission and/or reception on multiple physical channels in up to 32 serving cells. Here, the number of uplink component carriers may be less than the number of downlink component carriers.

For example, the base station device 3 may configure the PUCCH cell group. For example, the base station device 3 may transmit the higher layer signaling including information to be used to configure the PUCCH cell group. For example, an index (cell group index or information) for identifying a corresponding PUCCH cell group may be configured (defined), and the base station device 3 may transmit the higher layer signaling including the index to be used to identify the corresponding PUCCH cell group.

FIG. 3A illustrates a configuration where a first PUCCH cell group and a second cell group are configured as the PUCCH cell groups. For example, in FIG. 3A, the base station device 3 may transmit a downlink signal in the first cell group, and the terminal device 3 may transmit an uplink signal in the first cell group (may transmit uplink control information on the PUCCH in the first cell group). For example, in a case that 20 serving cells (downlink component carriers or downlink cells) are configured or activated in the first cell group, the base station device 3 and the terminal device 1 may transmit and receive uplink control information for the 20 downlink component carriers to and from each other.

To be more specific, the terminal device 1 may transmit HARQ-ACK for the 20 downlink component carriers (HARQ-ACK for transmission on the PDSCH and HARQ-ACK for transport blocks). The terminal device 1 may transmit CSI corresponding to each of the 20 downlink component carriers (e.g., periodic CSI and/or aperiodic CSI). The terminal device 1 may transmit SR per PUCCH cell group. Similarly, the base station device 3 and the terminal device 1 may transmit and receive uplink control information to and from each other in the second PUCCH cell group.

Similarly, the base station device 3 and the terminal device 1 may configure a PUCCH cell group as illustrated in FIG. 3B, and transmit and receive uplink control information to and from each other. The base station device 3 and the terminal device 1 may configure a PUCCH cell group as illustrated in FIG. 3C, and transmit and receive uplink control information to and from each other.

Here, one PUCCH cell group may include at least one PUCCH serving cell. One PUCCH cell group may include one PUCCH serving cell only. One PUCCH cell group may include one PUCCH serving cell and one or multiple non-PUCCH serving cells.

Here, the PUCCH cell group including the primary cell is referred to as a primary PUCCH cell group. The PUCCH cell group not including the primary cell is referred to as a secondary PUCCH cell group. In other words, the secondary PUCCH cell group may include a PUCCH secondary cell. For example, the index for the primary PUCCH cell group may always be defined as 0. The index for the secondary PUCCH cell group may be configured by the base station device 3 (or a network device).

The base station device 3 may transmit information to be used to indicate the PUCCH secondary cell, with the information included in the higher layer signaling and/or the PDCCH (downlink control information transmitted on the PDCCH). The terminal device 1 may determine the PUCCH secondary cell in accordance with the information to be used to indicate the PUCCH secondary cell.

As described above, the PUCCH in the PUCCH serving cell may be used to transmit uplink control information (HARQ-ACK, CSI (for example, periodic CSI), and/or SR) for serving cells (the PUCCH serving cell and the non-PUCCH serving cell) included in the PUCCH cell group to which the PUCCH serving cell belongs.

In other words, uplink control information (HARQ-ACK, CSI (for example, periodic CSI), and/or SR) for the serving cells (the PUCCH serving cell and the non-PUCCH serving cell) included in the PUCCH cell group is transmitted on the PUCCH in the PUCCH serving cell included in the PUCCH cell group.

FIGS. 4A and 4B are diagrams for illustrating the CSI report according to the present embodiment. FIG. 4A illustrates description on a 2-bit CSI request field for a PDCCH with an uplink DCI format. FIG. 4B illustrates description on a 3-bit CSI request field for a PDCCH with an uplink DCI format. For example, FIGS. 4A and 4B illustrate description on a CSI request field for a PDCCH with an uplink DCI format in a UE-specific search space.

The operations, which will be described below with reference to FIGS. 4A and 4B, may be performed for each PUCCH cell group. To be more specific, the base station device 3 and the terminal device 1 may perform the operations, which will be described with reference to FIGS. 4A and 4B, in one PUCCH cell group. In the description referring to FIGS. 4A and 4B, configuring more than one serving cell may indicate configuring more than one and up to five serving cells.

The operations, which will be described below with reference to FIGS. 4A and 4B, may be performed for each cell group configured by the base station device 3. For example, the base station device 3 may configure the cell group in association with the cell indicated using a carrier indicator field. Here, the carrier indicator field may be used to indicate the cell having the PDSCH and/or the PUSCH scheduled therefor. To be more specific, the base station device 3 and the terminal device 1 may perform the operations, which will be described with reference to FIGS. 4A and 4B, in one cell group configured by the base station device 3.

Here, the base station device 3 may trigger CSI transmission on the PUSCH (also referred to as the aperiodic CSI report) by transmitting information to be used to request transmission of CSI (also referred to as a CSI request) on the PDCCH. For example, the CSI request may be included in an uplink DCI format. Upon decoding of the uplink DCI format for a certain serving cell in subframe n, the terminal device 1 may perform aperiodic CSI reporting on the PUSCH in subframe n+k in the certain serving cell if the CSI request field is set to trigger a report.

Here, in a case that a size of the CSI request field is one bit, the aperiodic CSI report may be triggered for a certain serving cell. Here, the aperiodic CSI report being triggered for a certain serving cell indicates the aperiodic CSI report being triggered for the serving cell having the PUSCH scheduled therefor with a DCI format including a CSI request. To be more specific, in a case that the size of the CSI request field is one bit, the terminal device 1 may report CSI for the downlink component carrier corresponding to the uplink component carrier for which the PUSCH is scheduled.

In a case that the size of the CSI request field is two bits, the aperiodic CSI report may be triggered on the basis of the value corresponding to the aperiodic CSI reporting. For example, in a case that a value of the CSI request field is "00", the aperiodic CSI report does not need to be triggered. In a case that the value of the CSI request field is "01", the aperiodic CSI report may be triggered for a certain serving cell. In a case that the value of the CSI request field is "10", the aperiodic CSI report may be triggered for a first set ($1^{st}$ set) of one or more serving cells configured by the higher layers. In a case that the value of the CSI request field is "11", the aperiodic CSI report may be triggered for a second set ($2^{nd}$ set) of one or more serving cells configured by the higher layers.

For example, the base station device 3 may transmit the higher layer signaling including information to be used to configure the first set of one or more serving cells (also referred to as trigger1-r10) and/or information to be used to configure the second set of one or more serving cells (also referred to as trigger2-r10). Here, the information to be used to configure the first set (trigger1-r10) and/or the information to be used to configure the second set (trigger2-r10) may be transmitted with being included in first information (also referred to as aperiodicCSI-Trigger-r10, first parameter).

To be more specific, the first information and/or each piece of information included in the first information may indicate which aperiodic CSI report for a serving cell is triggered in a case that the aperiodic CSI report is triggered on the basis of the value of the 2-bit CSI request field.

The terminal device 1 may perform the aperiodic CSI report on the PUSCH in accordance with the first information, each piece of information included in the first information, and/or the value of the CSI request field.

In a case that the size of the CSI request field is three bits, the aperiodic CSI report may be triggered on the basis of the value corresponding to the aperiodic CSI reporting. To be more specific, in a case that the value of the CSI request field is "000", the aperiodic CSI report does not need to be triggered. In a case that the value of the CSI request field is "001", the aperiodic CSI report may be triggered for a certain serving cell. In a case that the value of the CSI request field is "010", the aperiodic CSI report may be triggered for the first set ($1^{st}$ set) of one or more serving cells configured by the higher layers. In a case that the value of the CSI request field is "011", the aperiodic CSI report may be triggered for the second set ($2^{nd}$ set) of one or more serving cells configured by the higher layers. Hereinafter, similarly, the serving cell for which the aperiodic CSI report is triggered may be indicated on the basis of the value of the CSI request field.

For example, the base station device 3 may transmit the higher layer signaling including information to be used to configure the first set (also referred to as trigger1-r13), information to be used to configure the second set (also referred to as trigger2-r13), information to be used to configure a third set (also referred to as trigger3-r13), information to be used to configure a fourth set (also referred to as trigger4-r13), information to be used to configure a fifth set (also referred to as trigger5-r13), and/or information to be used to configure a sixth set (also referred to as trigger6-r13).

Alternatively, the information to be used to configure the first set (trigger1-r13), the information to be used to configure the second set (trigger2-r13), the information to be used to configure the third set (trigger3-r13), the information to be used to configure the fourth set (trigger4-r13), the information to be used to configure the fifth set (trigger5-r13), and/or the information to be used to configure the sixth set (trigger6-r13) may be transmitted with being included in second information (also referred to as aperiodicCSI-Trigger-r13, or a second parameter).

To be more specific, the second information and/or each piece of information included in the second information may indicate which aperiodic CSI report for a serving cell is triggered in a case that the aperiodic CSI report is triggered on the basis of the value of the 3-bit CSI request field.

In other words, the terminal device 1 may perform the aperiodic CSI report on the PUSCH in accordance with the second information, each piece of information included in the second information, and/or the value of the CSI request field.

Here, in FIGS. 4A and 4B, a reporting mode for the aperiodic CSI report (also referred to as a CSI reporting mode, or a mode) may be given by use of third information (also referred to as cqi-ReportModeAperiodic-r8, or a third parameter) configured by the higher layers. For example, the base station device 3 may transmit, to the terminal device 1, the third information for each of the serving cells through the higher layer signaling. The terminal device 1 may report the aperiodic CSI on the basis of the reporting mode given by use of the third information. To be more specific, in the illustration of FIGS. 4A and 4B, the reporting mode for the aperiodic CSI report may be always given by use of the first parameter. The reporting mode for the aperiodic CSI report will be described later in detail.

FIGS. 5A and 5B are other diagrams for illustrating the aperiodic CSI report according to the present embodiment. FIG. 5A illustrates description on a 2-bit CSI request field for a PDCCH with an uplink DCI format, as illustration in FIG. 4A. FIG. 5B illustrates description on a 3-bit CSI request field for a PDCCH with an uplink DCI format, as illustration in FIG. 4B. For example, FIGS. 5A and 5B illustrate description on a CSI request field for a PDCCH with an uplink DCI format in a UE-specific search space.

The operations, which will be described below with reference to FIGS. 5A and 5B, may be performed for each PUCCH cell group. To be more specific, the base station device 3 and the terminal device 1 may perform the operations, which will be described with reference to FIGS. 5A and 5B, in one PUCCH cell group. In the description referring to FIGS. 5A and 5B, configuring more than one serving cell may indicate configuring more than one and up to five serving cells.

The operations, which will be described with reference to FIGS. 5A and 5B, may be performed for each cell group configured by the base station device 3. For example, the base station device 3 may configure the cell group in association with the cell indicated using a carrier indicator field. Here, the carrier indicator field may be used to indicate the cell having the PDSCH and/or the PUSCH scheduled therefor. To be more specific, the base station device 3 and the terminal device 1 may perform the operations, which will be described with reference to FIGS. 5A and 5B, in one cell group configured by the base station device 3.

As described above, the base station device 3 may trigger the CSI transmission (also referred to as the aperiodic CSI report) on the PUSCH by transmitting information to be used to request transmission of CSI on the PDCCH.

In FIGS. 5A and 5B, in a case that the size of the CSI request field is one bit, the aperiodic CSI report may be triggered for a certain serving cell. Furthermore, in a case that the size of the CSI request field is one bit, the reporting mode for the aperiodic CSI report may be given by use of the third information. To be more specific, in a case that the size of the CSI request field is one bit, the terminal device 1 may report, on the basis of the reporting mode given by use of the third information, the aperiodic CSI for the downlink component carrier corresponding to the uplink component carrier for which the PUSCH is scheduled.

In a case that the size of the CSI request field is two bits, the aperiodic CSI report may be triggered on the basis of the value corresponding to the aperiodic CSI reporting. Further, in a case that the size of the CSI request field is two bits, the reporting mode for the aperiodic CSI report may be indicated on the basis of the value corresponding to the aperiodic CSI reporting. Here, for example, in a case that the value of the CSI request field is "00", the aperiodic CSI report does not need to be triggered.

Here, in a case that the value of the CSI request field is "01", the aperiodic CSI report may be triggered for a certain serving cell. Further, in a case that the value of the CSI request field is "01", the reporting mode for the aperiodic CSI report may be given by use of the third information configured by the higher layers. To be more specific, in a case that the value of the CSI request field is "01", the terminal device 1 may report, on the basis of the reporting mode given by use of the third information, the aperiodic CSI for the downlink component carrier corresponding to the uplink component carrier for which the PUSCH is scheduled.

In a case that the value of the CSI request field is "01", the reporting mode for the aperiodic CSI report may be given by use of fourth information (also referred to as a cqi-ReportModeAperiodic-r13, or a fourth parameter) configured by the higher layers. To be more specific, in a case that the value of the CSI request field is "01", the terminal device 1 may report, on the basis of the reporting mode given by use of the fourth information, the aperiodic CSI for the downlink component carrier corresponding to the uplink component carrier for which the PUSCH is scheduled.

In a case that the value of the CSI request field is "10", the aperiodic CSI report may be triggered for a first set ($1^{st}$ set) of one or more serving cells configured by the higher layers. Further, in a case that the value of the CSI request field is "10", a reporting mode configured by the higher layers ($1^{st}$ reporting mode) may be used as the reporting mode for the aperiodic CSI report. For example, the base station device 3 may configure the reporting mode for the aperiodic CSI report in the case that the value of the CSI request field is "10" by transmitting fifth information (also referred to as cqi-ReportModeAperiodic-trigger10, or a fifth parameter). To be more specific, in a case that the value of the CSI request field is "10", the terminal device 1 may report the aperiodic CSI for the first set of one or more serving cells on the basis of the reporting mode given by use of the fifth information.

In a case that the value of the CSI request field is "11", the aperiodic CSI report may be triggered for the second set ($2^{nd}$ set) of one or more serving cells configured by the higher layers. Further, in a case that the value of the CSI request field is "11", a reporting mode configured by the higher layers ($2^{nd}$ reporting mode) may be used as the reporting mode for the aperiodic CSI report. For example, the base station device 3 may configure the reporting mode for the aperiodic CSI report in the case that the value of the CSI request field is "11" by transmitting sixth information (also referred to as cqi-ReportModeAperiodic-trigger11, or a sixth parameter). To be more specific, in a case that the value of the CSI request field is "11", the terminal device 1 may report the aperiodic CSI for the second set of one or more serving cells on the basis of the reporting mode given by use of the sixth information.

For example, the base station device 3 may transmit the fourth information to be used to configure the reporting mode to the terminal device 1. The base station device 3 may transmit information to be used to configure the first set of one or more serving cells (trigger1-r10) and/or the fifth information to be used to configure the reporting mode to the terminal device 1. The base station device 3 may transmit information to be used to configure the second set of one or more serving cells (trigger2-r10) and/or the sixth information to be used to configure the reporting mode to the terminal device 1.

For example, the base station device 3 may transmit seventh information (also referred to as a seventh parameter) including the fourth information, the information to be used to configure the first set of one or more serving cells (trigger1-r10), the fifth information to be used to configure the reporting mode, the information to be used to configure the second set of one or more serving cells (trigger2-r10) and/or the sixth information to be used to configure the reporting mode through the higher layer signaling. Here, the seventh information may be the first information (aperiodicCSI-Trigger-r10).

To be more specific, the seventh information and/or each piece of information included in the seventh information may indicate which aperiodic CSI report for a serving cell is triggered in a case that the aperiodic CSI report is triggered on the basis of the value of the 2-bit CSI request field. The seventh information and/or each piece of information included in the seventh information may indicate which reporting mode is used for the aperiodic CSI report in a case that the aperiodic CSI report is triggered on the basis of the value of the 2-bit CSI request field.

The terminal device 1 may perform the aperiodic CSI report on the PUSCH in accordance with the seventh information, each piece of information included in the seventh information, and/or the value of the CSI request field.

In a case that the size of the CSI request field is three bits, the aperiodic CSI report may be triggered on the basis of the value corresponding to the aperiodic CSI reporting. Further, in a case that the size of the CSI request field is three bits, the reporting mode for the aperiodic CSI report may be indicated on the basis of the value corresponding to the aperiodic CSI reporting. Here, for example, in a case that the value of the CSI request field is "000", the aperiodic CSI report does not need to be triggered.

In a case that the value of the CSI request field is "001", the aperiodic CSI report may be triggered for a certain serving cell. Further, in a case that the value of the CSI request field is "001", the reporting mode for the aperiodic CSI report may be given by use of the third (or fourth) information configured by the higher layers. To be more specific, in a case that the value of the CSI request field is "001", the terminal device 1 may report, on the basis of the reporting mode given by use of the third (or fourth) information, the aperiodic CSI for the downlink component carrier corresponding to the uplink component carrier for which the PUSCH is scheduled.

In a case that the value of the CSI request field is "001", the reporting mode for the aperiodic CSI report may be given by use of eighth information (also referred to as cqi-ReportModeAperiodic-trigger001, or an eighth parameter) configured by the higher layers. To be more specific, in a case that the value of the CSI request field is "001", the terminal device 1 may report, on the basis of the reporting mode given by use of the eighth information, the aperiodic CSI for the downlink component carrier corresponding to the uplink component carrier for which the PUSCH is scheduled.

In a case that the value of the CSI request field is "010", the aperiodic CSI report may be triggered for the first set ($1^{st}$ set) of one or more serving cells configured by the higher layers. Further, in a case that the value of the CSI request field is "010", the reporting mode ($1^{st}$ reporting mode) configured by the higher layers may be used as the reporting mode for the aperiodic CSI report. For example, the base station device 3 may configure the reporting mode for the aperiodic CSI report in the case that the value of the CSI request field is "010" by transmitting ninth information (also referred to as cqi-ReportModeAperiodic-trigger010, or a ninth parameter). To be more specific, in a case that the value of the CSI request field is "010", the terminal device 1 may report the aperiodic CSI for the first set of one or more serving cells on the basis of the reporting mode given by use of the ninth information.

In a case that the value of the CSI request field is "011", the aperiodic CSI report may be triggered for the second set ($2^{nd}$ set) of one or more serving cells configured by the higher layers. Further, in a case that the value of the CSI request field is "011", the reporting mode ($2^{nd}$ reporting mode) configured by the higher layers may be used as the reporting mode for the aperiodic CSI report. For example, the base station device 3 may configure the reporting mode for the aperiodic CSI report in the case that the value of the CSI request field is "011" by transmitting tenth information (also referred to as cqi-ReportModeAperiodic-trigger011, or a tenth parameter). To be more specific, in a case that the value of the CSI request field is "011", the terminal device 1 may report the aperiodic CSI for the second set of one or more serving cells on the basis of the reporting mode given by use of the tenth information.

Hereinafter, similarly, the serving cell for which the aperiodic CSI report is triggered may be indicated on the basis of the value of the CSI request field. Which reporting mode is used for the aperiodic CSI report may be indicated on the basis of the value of the CSI request field.

For example, the base station device 3 may transmit the eighth information to be used to configure the reporting mode to the terminal device 1. The base station device 3 may transmit information to be used to configure the first set of one or more serving cells (trigger1-r13) and/or the ninth information to be used to configure the reporting mode to the terminal device 1. The base station device 3 may transmit information to be used to configure the second set of one or more serving cells (trigger2-r13) and/or the tenth information to be used to configure the reporting mode to the terminal device 1.

Similarly, the base station device 3 may transmit information to be used to configure the third set ($3^{rd}$ set) of one or more serving cells (also referred to as trigger3-r13), and/or eleventh information (also referred to as cqi-ReportModeAperiodic-trigger100, or an eleventh parameter) to be used to configure a reporting mode ($3^{rd}$ reporting mode) to the terminal device 1. The base station device 3 may transmit information to be used to configure the fourth set ($4^{th}$ set) of one or more serving cells (trigger4-r13), and/or twelfth information (also referred to as cqi-ReportModeAperiodic-trigger101, or a twelfth parameter) to be used to configure a reporting mode ($4^{th}$ reporting mode) to the terminal device 1. The base station device 3 may transmit information to be used to configure the fifth set ($5^{th}$ set) of one or more serving cells (trigger5-r13), and/or thirteenth information (also referred to as cqi-ReportModeAperiodic-trigger110, or a thirteenth parameter) to be used to configure a reporting mode ($5^{th}$ reporting mode) to the terminal device 1. The base station device 3 may transmit information to be used to configure the sixth set ($6^{th}$ set) of one or more serving cells (trigger6-r13), and/or fourteenth information (also referred to as cqi-ReportModeAperiodic-trigger111, or a fourteenth parameter) to be used to configure a reporting mode ($6^{th}$ reporting mode) to the terminal device 1.

For example, the base station device 3 may transmit fifteenth information including the eighth information, the information to be used to configure the first set of one or more serving cells (trigger1-r13), the ninth information to be used to configure the reporting mode, the information to be used to configure the second set of one or more serving cells (trigger2-r13), the tenth information to be used to configure the reporting mode, the information to be used to configure the third set of one or more serving cells (trigger3-r13), the eleventh information to be used to configure the reporting mode, the information to be used to configure the fourth set of one or more serving cells (trigger4-r13), the twelfth information to be used to configure the reporting mode, the information to be used to configure the fifth set of one or more serving cells (trigger5-r13), the thirteenth information to be used to configure the reporting mode, the information to be used to configure the sixth set of one or more serving cells (trigger6-r13), and/or the fourteenth information to be used to configure the reporting mode through the higher layer signaling. Here, the fifteenth information may be the second information (aperiodicCSI-Trigger-r13).

To be more specific, the fifteenth information and/or each piece of information included in the fifteenth information may indicate which aperiodic CSI report for a serving cell is triggered in a case that the aperiodic CSI report is triggered on the basis of the value of the 3-bit CSI request field. The fifteenth information and/or each piece of information included in the fifteenth information may indicate which reporting mode is used for the aperiodic CSI report in a case that the aperiodic CSI report is triggered on the basis of a value of a 3-bit CSI request field.

The terminal device 1 may perform the aperiodic CSI report on the PUSCH in accordance with the fifteenth information, each piece of information included in the fifteenth information, and/or the value of the CSI request field.

Here, in FIGS. 5A and 5B, the base station device 3 may configure (or may independently configure) the reporting mode for the aperiodic CSI report for each of the serving cells configured as a set of one or more serving cells. For example, in a case that the base station device 3 uses a bitmap to configure "10111001011100111111101100111011 (32 bits)" as the first set of one or more serving cells, the base station device 3 may configure the reporting mode for the aperiodic CSI report correspondingly to each serving cell for which "1" is set. Here, "1" may indicate the serving cell for which the aperiodic CSI report is triggered, and "0" may indicate the serving cell for which the aperiodic CSI report is not triggered.

To be more specific, in this case, the base station device 3 may configure the reporting mode for each of the aperiodic CSI reports for 22 serving cells for which "1" are set. The terminal device 1 may perform the aperiodic CSI report by using the configured reporting mode for each of 22 serving cells for which "1" are set.

To be more specific, as described above, the base station device 3 may configure (or determine) the reporting mode for the aperiodic CSI report on the basis of the information only in the higher layers (e.g., the third information and/or the fourth information). Hereinafter, configuring (or determining) the reporting mode on the basis of the information only in the higher layers to perform the aperiodic CSI report is also referred to as a first operation.

As described above, the base station device 3 may configure (or determine) the reporting mode for the aperiodic CSI report on the basis of the information in the higher layers (e.g., the fifth information, the sixth information, the eighth information, the ninth information, the tenth information, the eleventh information, the twelfth information, the thirteenth information, and/or the fourteenth information), and the value corresponding to the aperiodic CSI reporting. Hereinafter, configuring (or determining) the reporting mode on the basis of the information in the higher layers, and the value corresponding to the aperiodic CSI reporting to perform the aperiodic CSI report is also referred to as a second operation.

Here, as described above, in the second operation, the base station device 3 may configure the reporting mode common to one or more configured serving cells. As described above, the base station device 3 may configure (or determine) the reporting mode independently for one or more serving cells configured on the basis of the information in the higher layers and the value corresponding to the aperiodic CSI reporting. Hereinafter, configuring (or determining) the reporting mode common to one or more serving cells on the basis of the information in the higher layers and the value corresponding to the aperiodic CSI reporting to perform the aperiodic CSI report is also referred to as a second-(1) operation. Configuring (or determining) the reporting mode independently for one or more serving cells on the basis of the information in the higher layers and the value corresponding to the aperiodic CSI reporting to perform the aperiodic CSI report is also referred to as a second-(2) operation.

Here, the base station device 3 may configure which of the first operation, the second operation, the second-(1) operation, and/or, the second-(2) operation to be performed, in the terminal device 1. For example, the base station device 3 may transmit a seventeenth information to be used to configure which of the first operation, the second operation, the second-(1) operation, and/or, the second-(2) operation to be performed, through the higher layer signaling. For example, the base station device 3 may configure which of the first operation and the second operation to be performed, in the terminal device 1. For example, the base station device 3 may configure which of the first operation and the second-(1) operation to be performed, in the terminal device 1. For example, the base station device 3 may configure which of the first operation and the second-(2) operation to be performed, in the terminal device 1.

Here, in FIGS. 4A, 4B, 5A and 5B, the base station device 3 may transmit, to the terminal device 1, the first information, the second information, the seventh information and/or the fifteenth information for each of the serving cells through the higher layer signaling. The terminal device 1 may receive, from the base station device 3, the first information, the second information, the seventh information and/or the fifteenth information for each of the serving cells through higher layer signaling. In other words, the first information, the second information, the seventh information and/or the fifteenth information may be used to configure each of the sets of one or more serving cells for each of the serving cells with an uplink resource (an uplink component carrier).

In FIGS. 4A, 4B, 5A and 5B, each of the sets of one or more serving cells configured by using the first information, the second information, the seventh information and/or the fifteenth information may include up to five serving cells (up to five serving cells may be indicated using a 8-bit bit map). Each of the sets of one or more serving cells configured by using the first information, the second information, the seventh information and/or the fifteenth information may include up to 32 serving cells (up to 32 serving cells may be indicated using a 32-bit bit map).

In FIGS. 4A, 4B, 5A and 5B, different tables may be defined for the case that the size of the CSI request field is two bits and the case that the size of the CSI request field is three bits. Alternatively, one common table may be defined for the case that the size of the CSI request field is two bits and the case that the size of the CSI request field is three bits.

Here, the operations described with reference to FIGS. 4A and 4B may be performed in a case that one serving cell is configured. The operations described with reference to FIGS. 4A and 4B may be also performed in a case that more than one serving cell is configured (or activated). The operations described with reference to FIGS. 4A and 4B may be also performed in a case that more than five serving cells are configured (or activated).

The operations described with reference to FIGS. 5A and 5B may be performed in a case that one serving cell is configured. The operations described with reference to FIGS. 5A and 5B may be also performed in a case that more than one serving cell is configured (or activated). The operations described with reference to FIGS. 5A and 5B may be also performed in a case that more than five serving cells are configured (or activated).

Here, the base station device 3 may configure which of the operation described with reference to FIGS. 4A and 4B and the operation described with reference to FIGS. 5A and 5B to be performed, in the terminal device 1 through the higher layer signaling. For example, the base station device 3 may transmit sixteenth information (also referred to as a sixteenth parameter) to be used to configure either that the value of the CSI request field by which the aperiodic CSI report is triggered only indicates which aperiodic CSI report for a serving cell is triggered (the operation described with reference to FIGS. 4A and 4B), or that the value of the CSI request field by which the aperiodic CSI report is triggered indicates which aperiodic CSI report for a serving cell is triggered, and which reporting mode is used for the aperiodic CSI report (the operation described with reference to FIGS. 5A and 5B).

In FIGS. 4A, 4B, 5A and 5B, the size of the CSI request field may be determined at least on the basis of the number of configured serving cells (downlink cells) and/or the search space to which the DCI format is mapped. Alternatively, the size of the CSI request field may be determined at least on the basis of the number of activated serving cells (downlink cells) and/or the search space to which the DCI format is mapped.

For example, when one serving cell is configured for the terminal device 1, a 1-bit field may apply to the CSI request field (to a CSI request). When the DCI format is mapped to the common search space, a 1-bit field may apply to the CSI request field. For example, the terminal device 1 for which one serving cell is configured may assume the size of the CSI request field to be one bit. When the DCI format is detected (or received) in the common search space, the size of the CSI request field may be assumed to be one bit.

When the terminal device 1 is configured (or activated) with more than one serving cell and the DCI format is mapped to the UE-specific search space, a 2-bit field may apply to the CSI request field, in terms of the size. As described above, the UE-specific search space may be given at least by the C-RNTI. For example, when the DCI format is detected in the UE-specific search space, the terminal device 1 configured with more than one serving cell may assume the size of the CSI request field to be two bits.

When more than five serving cells are configured (or activated) and the DCI format is mapped to the UE-specific search space, a 3-bit field may apply to CSI request field, in terms of the size. For example, when the DCI format is detected in the UE-specific search space, the terminal device 1 for which more than five serving cells are configured or activated may assume the size of the CSI request field to be three bits.

As described above, the base station device 3 and the terminal device 1 may perform the above-described operations in one cell group (hereinafter, the cell group may include the PUCCH cell group). As described above, the base station device 3 may configure the cell group in the terminal device 1. Here, one PUCCH cell group may be the cell group to which the serving cell having the PUSCH scheduled therefor with the DCI format (in other words, the DCI format including a CSI request, which is also referred to as a corresponding DCI format below) belongs.

To be more specific, for example, when one serving cell is configured for the terminal device 1 in the cell group to which the serving cell having the PUSCH scheduled therefor with the corresponding DCI format belongs, a 1-bit field may apply to the CSI request field, in terms of the size. When the corresponding DCI format is mapped to the common search space, a 1-bit field may apply to the CSI request field, in terms of the size.

When more than one serving cell is configured for the terminal device 1 in the cell group to which the serving cell having the PUSCH scheduled therefor with the corresponding DCI format belongs, and the corresponding DCI format is mapped to the UE-specific search space, a 2-bit field may apply to the CSI request field, in terms of the size.

When more than five serving cells are configured for the terminal device 1 in the cell group to which the serving cell having the PUSCH scheduled therefor with the corresponding DCI format belongs, and the corresponding DCI format is mapped to the UE-specific search space, a 3-bit field may apply to the CSI request field, in terms of the size.

In other words, for example, in a case that the first cell group and the second cell group are configured, when one serving cell is configured in the first cell group and the PUSCH for the serving cell belonging to the first cell group is scheduled with the DCI format mapped to the UE-specific search space and/or the common search space, a 1-bit field may apply to the CSI request field, in terms of the size.

In a case that the first cell group and the second cell group are configured, when one serving cell is configured in the second cell group and the PUSCH for the serving cell belonging to the second cell group is scheduled with the DCI format mapped to the UE-specific search space and/or the common search space, a 1-bit field may apply to the CSI request field, in terms of the size.

For example, in a case that the first cell group and the second cell group are configured, when more than one serving cell is configured in the first PUCCH cell group and the PUSCH for the serving cell belonging to the first cell group is scheduled with the DCI format mapped to the UE-specific search space, a 2-bit field may apply to the CSI request field, in terms of the size.

In a case that the first cell group and the second cell group are configured, when more than one serving cell is configured in the second cell group and the PUSCH for the serving cell belonging to the second cell group is scheduled with the DCI format mapped to the UE-specific search space, a 2-bit field may apply to the CSI request field, in terms of the size.

For example, in a case that the first cell group and the second cell group are configured, when more than five serving cells are configured or activated in the first cell group and the PUSCH for the serving cell belonging to the first PUCCH cell group is scheduled with the DCI format mapped to the UE-specific search space, a 3-bit field may apply to the CSI request field, in terms of the size.

In a case that the first cell group and the second cell group are configured, when more than five serving cells are configured or activated in the second cell group and the PUSCH for the serving cell belonging to the second cell group is scheduled with the DCI format mapped to the UE-specific search space, a 3-bit field may apply to the CSI request field, in terms of the size.

In other words, in a case that, for the terminal device 1, one serving cell in the corresponding cell group is configured or the corresponding DCI format is mapped to the common search space, a 1-bit field may apply to the CSI request field, in terms of the size. In a case that, for the terminal device 1, more than one serving cell in the corresponding cell group is configured and the corresponding DCI format is mapped to the UE-specific search space, a 2-bit field may apply to the CSI request field, in terms of the size. In a case that, for the terminal device 1, more than five serving cells in the corresponding cell group are configured and the corresponding DCI format is mapped to the UE-specific search space, a 3-bit field may apply to the CSI request field, in terms of the size.

Here, the corresponding cell group may be a cell group to which the serving cell having the PUSCH scheduled therefor with the DCI format (in other words, the DCI format including a CSI request) belongs. The corresponding DCI format may be a DCI format for requesting an aperiodic CSI report (in other words, a DCI format including a CSI request).

Here, in the present embodiment, description has been given of cases that the size of the CSI request field is one bit, two bits, and three bits, as examples. However, it goes without saying that the size of the CSI request field may be the number of bits larger than three.

Here, as described above, the base station device 3 and the terminal device 1 may transmit and receive aperiodic CSI on the PUCCH in a certain subframe. The base station device 3 and the terminal device 1 may transmit and receive aperiodic CSI on the PUSCH in a certain subframe. Here, in case both periodic and aperiodic CSI reporting would occur in the same subframe, the terminal device 1 (UE) shall only transmit the aperiodic CSI report in that subframe. In other words, in a case that both periodic CSI reporting and aperiodic CSI reporting occur in the same subframe, the terminal device 1 may drop the periodic CSI report in the subframe.

Here, in a case that a periodic CSI report for a certain serving cell and an aperiodic CSI report for a serving cell different from the certain serving cell occur in the same subframe, the terminal device 1 may transmit both the periodic CSI report and the aperiodic CSI report in the subframe. In other words, in a case that a periodic CSI report and an aperiodic CSI report for different serving cells occur in the same subframe, the terminal device 1 may transmit both the periodic CSI report and the aperiodic CSI report in the subframe.

In other words, in a case that a periodic CSI report for a certain serving cell and an aperiodic CSI report for the certain serving cell occur in the same subframe, the terminal device 1 may only transmit the aperiodic CSI report in the subframe. In other words, in a case that a periodic CSI report and an aperiodic CSI report for the same serving cell occur in the same subframe, the terminal device 1 may only transmit the aperiodic CSI report in the subframe. In other words, in a case that periodic CSI reporting and aperiodic CSI reporting for the same serving cell occur in the same subframe, the terminal device 1 may drop the periodic CSI report in the subframe.

FIG. 6 is a diagram for illustrating the reporting mode for the aperiodic CSI report. For example, the reporting mode for the aperiodic CSI report may be configured to correspond to each of transmission modes for the PDSCH (e.g., from transmission mode 1 to transmission mode 10). For example, only mode 1-0, mode 2-0, and mode 3-0 illustrated in FIG. 6 may be configurable (or supported) with respect to transmission mode 1. For example, only mode 1-2, mode 2-2, mode 3-1, and mode 3-2 illustrated in FIG. 6 may be configurable (or supported) with respect to transmission mode 4. Here, the base station device 3 may configure the transmission mode for the PDSCH in the terminal device 1 through the higher layer signaling. As described above, the base station device 3 may configure the reporting mode for the aperiodic CSI report.

The base station device 3 and the terminal device 1 may perform the CSI reporting on the PUSCH in a certain subframe on the basis of feedback types of the CQI and PMI illustrated in FIG. 6.

For example, in a case that mode 1-0 is configured, only a single wideband CQI may be reported in a certain subframe. In a case that mode 1-2 is configured, a single CQI (wideband CQI) and multiple PMIs (subband PMI) may be reported in a certain subframe.

In a case that mode 2-0 is configured, only a single CQI (wideband CQI) selected by the terminal device 1 may be reported in a certain subframe. In a case that mode 2-2 is configured, a single CQI (wideband CQI) related to a subband(s) selected by the terminal device 1, and multiple PMIs (subband PMIs) may be reported in a certain subframe.

In a case that mode 3-0 is configured, only a single CQI (wideband CQI) related to the subband(s) configured by the base station device 3 may be reported in a certain subframe. In a case that mode 3-1 is configured, multiple CQIs (subband CQIs) related to the subband(s) configured by the base station device 3, and a single PMI may be reported in a certain subframe. In a case that mode 3-2 is configured, multiple CQIs (subband CQIs) related to the subband(s) configured by the base station device 3, and multiple PMIs (subband PMIs) may be reported in a certain subframe.

Here, a set of subbands (S) the terminal device 1 (UE) shall evaluate for the CQI reporting may span the entire downlink system bandwidth. In other words, the set of subbands for which the CSI reporting is evaluated (calculated or computed) is also referred to as a set S (set S subband). Here, the set S may be the downlink system bandwidth. The set S may be defined for each serving cell. The set S subband may be configured by the base station device 3. For example, the base station device 3 may transmit the eighteenth information to be used to configure the set S subband. Here, the subband may be a set of contiguous physical resource blocks.

As illustrated in FIG. 6, mode 1-0 is supported in the present embodiment. Here, mode 1-0 is also referred to as wideband-only CQI reporting. As described above, the terminal device 1 may report one (single) CQI value in mode 1-0. For example, the terminal device 1 may report one wideband CQI value for each codeword in mode 1-0. Here, one CQI value may be calculated assuming transmission on the set S subband. One CQI value may be calculated assuming that a corresponding and selected precoding matrix in each subband is used.

As illustrated in FIG. 6, mode 1-1 is supported in the present embodiment. Here, mode 1-1 is also referred to as wideband-only CQI reporting and Single PMI reporting. Here, the terminal device 1 may report one (single) CQI value, and one (single) PMI (a value of PMI) in mode 1-1. For example, the terminal device 1 may report one wideband CQI value for each codeword in mode 1-1. Here, one CQI value may be calculated assuming transmission on set S subband. The single PMI (the value of PMI) may be selected from a code book subset assuming transmission on the set S subband (a single precoding matrix is selected from the code book subset assuming transmission on set S subband). Here, the base station device 3 may configure the code book subset usable as a code book, in the terminal device 1 through the higher layer signaling.

As described above, the base station device 3 may configure the set S subband in the terminal device 1. To be more specific, the base station device 3 may configure the set of subbands (downlink bandwidth) the terminal device 1 shall evaluate (calculate or compute), in mode 1-0. The terminal device 1 may report the CQI calculated assuming transmission on the set of subbands configured by the base station device 3. Here, the terminal device 1 may report the CQI calculated assuming transmission at the downlink system bandwidth in each serving cell.

For example, as described above, in a case that mode 1-0 is configured as the reporting mode for the aperiodic CSI report by the base station device 3, the terminal device 1 may perform the aperiodic CSI report by using mode 1-0.

For example, as described above, in a case that the base station device 3 uses a bitmap to configure "10111001011100111111101100111011 (32 bits)" as the first set of one or more serving cells, the terminal device 1 for which mode 1-0 is configured may perform the aperiodic CSI report for 22 serving cells each for which "1" is set, by using mode 1-0. For example, in a case that the CQI for one serving cell is represented by 4 bits, the terminal device 1 may perform the aperiodic CSI report of 88 bits (22×4).

For example, as described above, in a case that the base station device 3 uses a bitmap to configure "10111001011100111111101100111011 (32 bits)" as the first set of one or more serving cells, and mode 1-0 is configured (independently configured) for 10 serving cells, the terminal device 1 may perform the aperiodic CSI report for corresponding 10 serving cells, by using in mode 1-0. For example, in a case that the CQI for one serving cell is represented by 4 bits, the number of bits of the aperiodic CSI report performed by using mode 1-0 may be 40 bits. In this case, the terminal device 1 may perform the aperiodic CSI report for remaining 12 serving cells (the serving cells for which mode 1-0 is not configured, among 22 serving cells each for which "1" is set) by using an independently configured reporting mode. In other words, the terminal device 1 may report, on one PUSCH, the CSI (wideband-only CQI) for 10 serving cells on the basis of mode 1-0 and the CSI for 12 serving cells on the basis of another mode.

As described above, configuring the reporting mode for the aperiodic CSI reporting makes it possible to more flexibly configure the reporting mode. For example, configuring the reporting mode for the aperiodic CSI report on the basis of the information in the higher layers and the value corresponding to the aperiodic CSI reporting makes it possible to more dynamically configure the reporting mode. Configuring the reporting mode common to one or more serving cells for which the aperiodic CSI reporting is triggered makes it possible to configure the reporting mode taking into account an information amount (information amount relating to configuration of the reporting mode). Configuring the reporting modes independently for one or more serving cells for which the aperiodic CSI reporting is triggered makes it possible to more flexibly configure the reporting mode. For example, configuring the reporting modes independently for one or more serving cells for which the aperiodic CSI reporting is triggered makes it possible to flexibly configure one or more serving cells for which the wideband-only CQI reporting is performed.

Configurations of devices according to the present embodiment will be described below.

Figure 7:
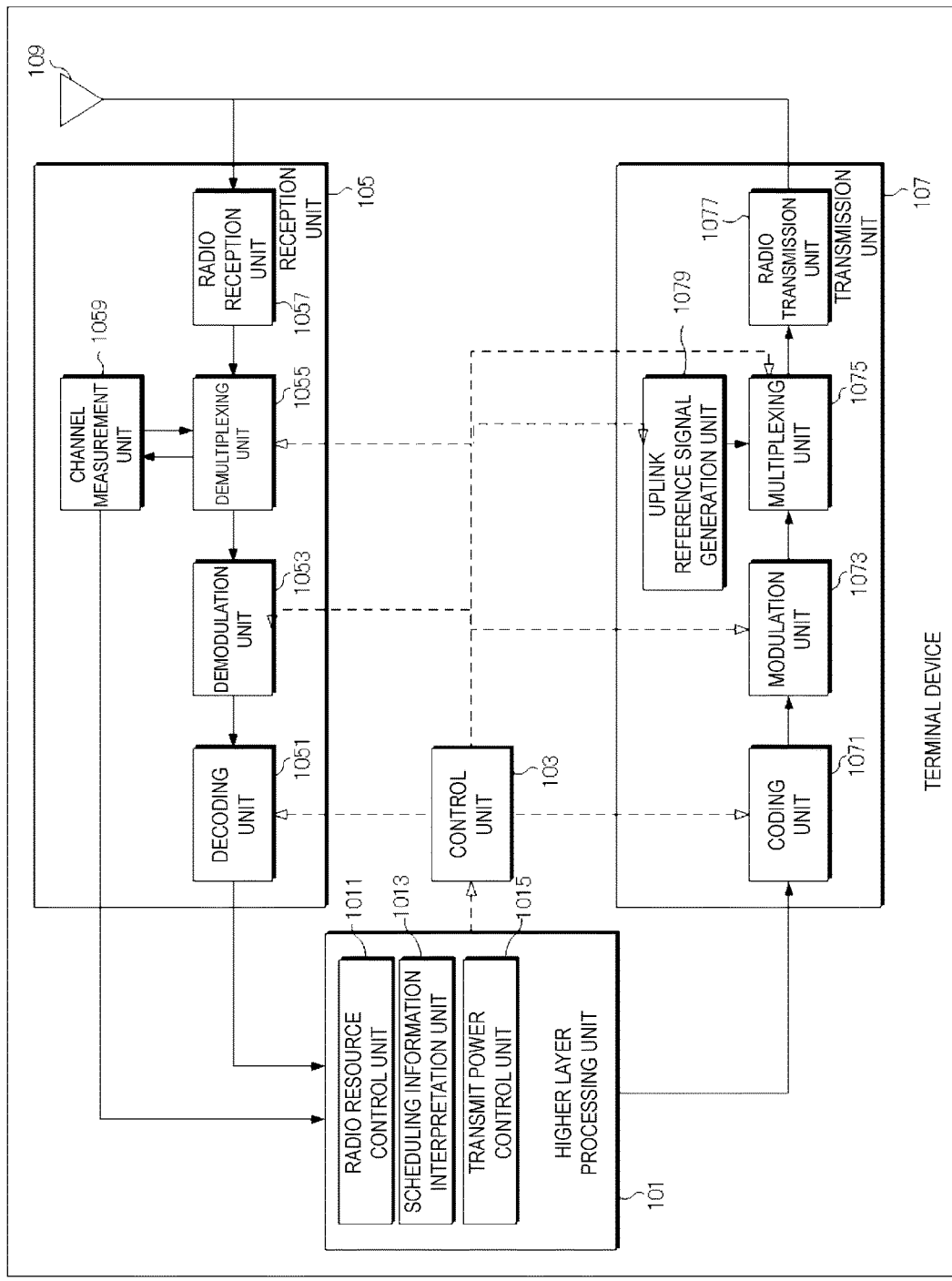
FIG. 7 is a schematic block diagram illustrating a configuration of a terminal device 1 according to the present embodiment.

FIG. 7 is a schematic block diagram illustrating a configuration of the terminal device 1 according to the present embodiment. As illustrated in FIG. 7, the terminal device 1 is configured to include a higher layer processing unit 101, a control unit 103, a reception unit 105, a transmission unit 107, and a transmit and receive antenna 109. The higher layer processing unit 101 is configured to include a radio resource control unit 1011, a scheduling information interpretation unit 1013, and a transmit power control unit 1015. The reception unit 105 is configured to include a decoding unit 1051, a demodulation unit 1053, a demultiplexing unit 1055, a radio reception unit 1057, and a channel measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. The higher layer processing unit 101 performs processing of the medium access control (MAC) layer, the packet data convergence protocol (PDCP) layer, the radio link control (RLC) layer, and the radio resource control (RRC) layer.

The radio resource control unit 1011 included in the higher layer processing unit 101 manages various configuration information/parameters of the terminal device 1 itself. The radio resource control unit 1011 sets the various configuration information/parameters in accordance with the higher layer signaling received from the base station device 3. To be more specific, the radio resource control unit 1011 sets the various configuration information/parameters in accordance with the information indicating the various configuration information/parameters received from the base station device 3. Furthermore, the radio resource control unit 1011 generates information to be mapped to each uplink channel, and outputs the generated information to the transmission unit 107. The radio resource control unit 1011 is also referred to as a configuration unit 1011.

Here, the scheduling information interpretation unit 1013 included in the higher layer processing unit 101 interprets the DCI format (scheduling information) received through the reception unit 105, generates control information for control of the reception unit 105 and the transmission unit 107, in accordance with a result of interpreting the DCI format, and outputs the generated control information to the control unit 103.

The transmit power control unit 1015 included in the higher layer processing unit 101 controls the transmit power for transmission on the PUSCH and the PUCCH in accordance with various configuration information/parameters managed by the radio resource control unit 1011, a TPC command, and the like.

In accordance with the control information originating from the higher layer processing unit 101, the control unit 103 generates a control signal for control of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station device 3 through the transmit and receive antenna 109, and outputs the information resulting from the decoding, to the higher layer processing unit 101.

The radio reception unit 1057 converts (down-converts) a downlink signal received through the transmit and receive antenna 109 into a baseband signal through orthogonal demodulation, removes unnecessary frequency components, controls an amplification level in such a manner as to suitably maintain a signal level, performs orthogonal demodulation on the basis of an in-phase component and an orthogonal component of the received signal, and converts the resulting orthogonally-demodulated analog signal into a digital signal. The radio reception unit 1057 removes a portion corresponding to a cyclic prefix (CP) from the digital signal resulting from the conversion, performs fast Fourier transform (FFT) on the signal from which the CP has been removed, and extracts a signal in the frequency domain.

The demultiplexing unit 1055 demultiplexes the extracted signal into the PHICH, the PDCCH, the EPDCCH, the PDSCH, and the downlink reference signal. Moreover, the demultiplexing unit 1055 makes a compensation of channels including the PHICH, the PDCCH, the EPDCCH, and the PDSCH, from a channel estimate input from the channel measurement unit 1059. Furthermore, the demultiplexing unit 1055 outputs the downlink reference signal resulting from the demultiplexing, to the channel measurement unit 1059.

The demodulation unit 1053 multiplies the PHICH by a corresponding code for composition, demodulates the resulting composite signal in compliance with a binary phase shift keying (BPSK) modulation scheme, and outputs a result of the demodulation to the decoding unit 1051. The decoding unit 1051 decodes the PHICH destined for the terminal device 1 itself and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as quadrature phase shift keying (QPSK), 16 quadrature amplitude modulation (QAM), or 64 QAM, and outputs a result of the demodulation to the decoding unit 1051. The decoding unit 1051 decodes the data in accordance with information on a coding rate notified with the downlink control information, and outputs, to the higher layer processing unit 101, the downlink data (the transport block) resulting from the decoding.

The channel measurement unit 1059 measures a downlink path loss or a channel state from the downlink reference signal input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055. The channel measurement unit 1059 performs channel measurement and/or interference measurement in order to calculate the CQI (or the CSI).

The transmission unit 107 generates the uplink reference signal in accordance with the control signal input from the control unit 103, codes and modulates the uplink data (the transport block) input from the higher layer processing unit 101, multiplexes the PUCCH, the PUSCH, and the generated uplink reference signal, and transmits a result of the multiplexing to the base station device 3 through the transmit and receive antenna 109. Furthermore, the transmission unit 107 transmits uplink control information.

The coding unit 1071 performs coding, such as convolutional coding or block coding, on the uplink control information input from the higher layer processing unit 101. Furthermore, the coding unit 1071 performs turbo coding in accordance with information used for the scheduling of the PUSCH.

The modulation unit 1073 modulates coded bits input from the coding unit 1071, in compliance with the modulation scheme notified with the downlink control information, such as BPSK, QPSK, 16 QAM, or 64 QAM, or in compliance with a modulation scheme prescribed in advance for each channel. In accordance with the information used for the scheduling of the PUSCH, the modulation unit 1073 determines the number of data sequences to be spatial-multiplexed, maps multiple pieces of uplink data to be transmitted on the same PUSCH to multiple sequences through multiple input multiple output spatial multiplexing (MIMO SM), and performs precoding on the sequences.

The uplink reference signal generation unit 1079 generates a sequence acquired in accordance with a rule (formula) prescribed in advance, on the basis of a physical layer cell identifier (also referred to as a physical cell identity (PCI), a cell ID, or the like) for identifying the base station device 3, a bandwidth to which the uplink reference signal is mapped, a cyclic shift notified with the uplink grant, a parameter value for generation of a DMRS sequence, and the like. In accordance with the control signal input from the control unit 103, the multiplexing unit 1075 rearranges modulation symbols of the PUSCH in parallel and then performs discrete Fourier transform (DFT) on the rearranged modulation symbols. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmission unit 1077 performs inverse fast Fourier transform (IFFT) on a signal resulting from the multiplexing, generates an SC-FDMA symbol, attaches a CP to the generated SC-FDMA symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 109 for transmission.

Figure 8:
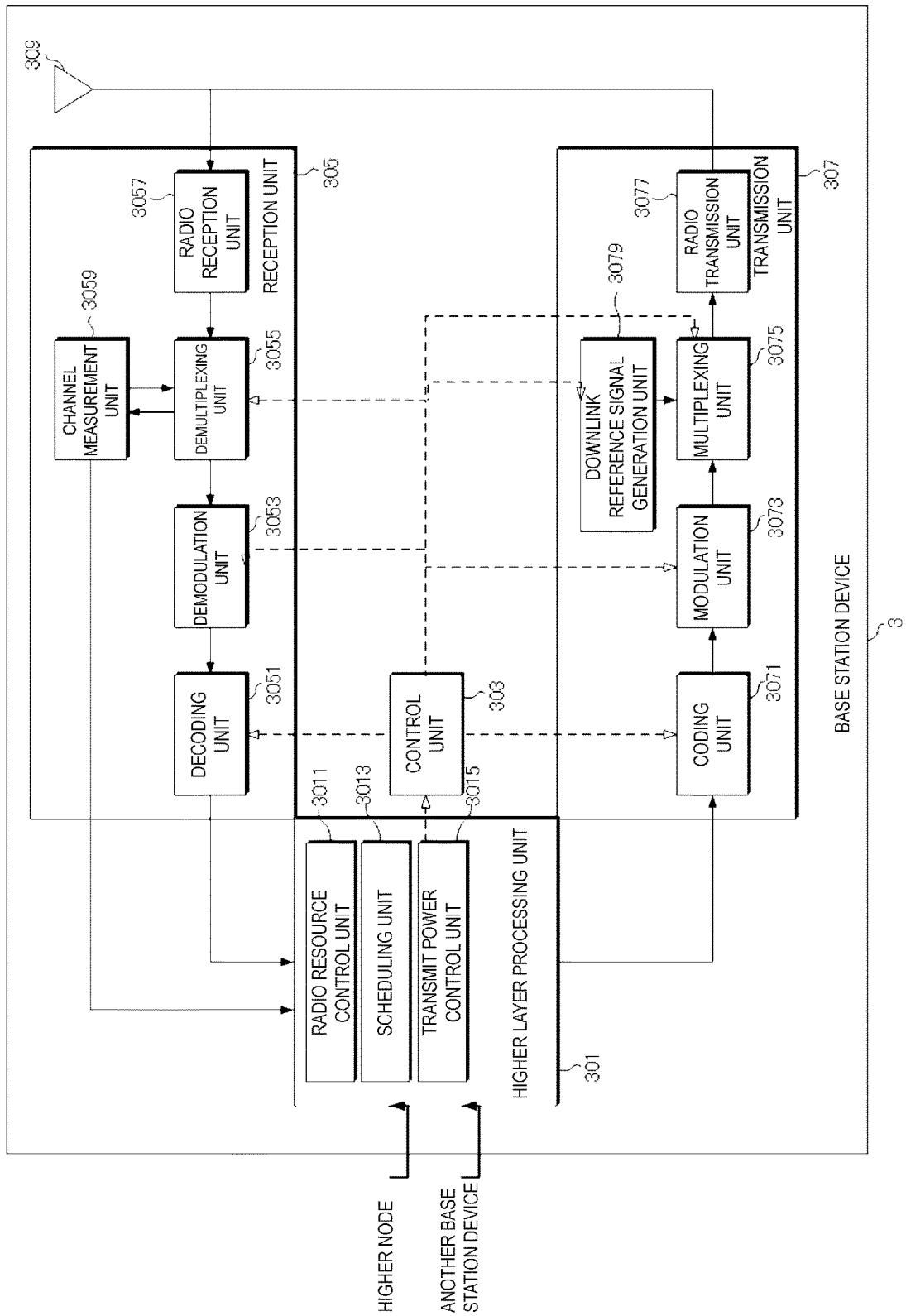
FIG. 8 is a schematic block diagram illustrating a configuration of a base station device 3 according to the present embodiment.

FIG. 8 is a schematic block diagram illustrating a configuration of the base station device 3 according to the present embodiment. As illustrated in FIG. 8, the base station device 3 is configured to include a higher layer processing unit 301, a control unit 303, a reception unit 305, a transmission unit 307, and a transmit and receive antenna 309. The higher layer processing unit 301 is configured to include a radio resource control unit 3011, a scheduling unit 3013, and a transmit power control unit 3015. The reception unit 305 is configured to include a decoding unit 3051, a demodulation unit 3053, a demultiplexing unit 3055, a radio reception unit 3057, and a channel measurement unit 3059. The transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the medium access control (MAC) layer, the packet data convergence protocol (PDCP) layer, the radio link control (RLC) layer, and the radio resource control (RRC) layer. Furthermore, the higher layer processing unit 301 generates control information for control of the reception unit 305 and the transmission unit 307, and outputs the generated control information to the control unit 303.

The radio resource control unit 3011 included in the higher layer processing unit 301 generates, or acquires from a higher node, the downlink data (the transport block) mapped to the downlink PDSCH, system information, the RRC message, the MAC control element (CE), and the like, and outputs a result of the generation or the acquirement to the transmission unit 307. Furthermore, the radio resource control unit 3011 manages various configuration information/parameters for each of the terminal devices 1. The radio resource control unit 3011 may set various configuration information/parameters for each of the terminal devices 1 through the higher layer signaling. In other words, the radio resource control unit 1011 transmits/broadcasts information indicating various configuration information/parameters. The radio resource control unit 3011 is also referred to as a configuration unit 3011.

The scheduling unit 3013 included in the higher layer processing unit 301 determines a frequency and a subframe to which the physical channels (the PDSCH and the PUSCH) are allocated, the coding rate and modulation scheme for the physical channels (the PDSCH and the PUSCH), the transmit power, and the like, from the received channel state information and from the channel estimate, channel quality, or the like input from the channel measurement unit 3059. The scheduling unit 3013 generates the control information (for example, the DCI format) in order to control the reception unit 305 and the transmission unit 307 in accordance with a result of the scheduling, and outputs the generated information to the control unit 303. The scheduling unit 3013 further determines timing of performing transmission processing and reception processing.

The transmit power control unit 3015 included in the higher layer processing unit 301 controls the transmit power for transmission on the PUSCH and the PUCCH performed by the terminal device 1, in accordance with various configuration information/parameters managed by the radio resource control unit 3011, a TPC command, and the like.

In accordance with the control information originating from the higher layer processing unit 301, the control unit 303 generates a control signal for control of the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal device 1 through the transmit and receive antenna 309, and outputs information resulting from the decoding to the higher layer processing unit 301. The radio reception unit 3057 converts (down-converts) an uplink signal received through the transmit and receive antenna 309 into a baseband signal through orthogonal demodulation, removes unnecessary frequency components, controls the amplification level in such a manner as to suitably maintain a signal level, performs orthogonal demodulation on the basis of an in-phase component and an orthogonal component of the received signal, and converts the resulting orthogonally-demodulated analog signal into a digital signal. The reception unit 305 receives uplink control information.

The radio reception unit 3057 removes a portion corresponding to a cyclic prefix (CP) from the digital signal resulting from the conversion. The radio reception unit 3057 performs fast Fourier transform (FFT) on the signal from which the CP has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. The demultiplexing is performed on the basis of radio resource allocation information that is determined in advance by the base station device 3 using the radio resource control unit 3011 and that is included in the uplink grant notified to each of the terminal devices 1. Furthermore, the demultiplexing unit 3055 makes a compensation of channels including the PUCCH and the PUSCH from the channel estimate input from the channel measurement unit 3059. Furthermore, the demultiplexing unit 3055 outputs an uplink reference signal resulting from the demultiplexing, to the channel measurement unit 3059.

The demodulation unit 3053 performs inverse discrete Fourier transform (IDFT) on the PUSCH, acquires modulation symbols, and performs reception signal demodulation, that is, demodulates each of the modulation symbols on the PUCCH and the PUSCH, in compliance with the modulation scheme prescribed in advance, such as binary phase shift keying (BPS K), QPSK, 16 QAM, or 64 QAM, or in compliance with the modulation scheme that the base station device 3 itself notifies in advance each of the terminal devices 1 with the uplink grant. The demodulation unit 3053 demultiplexes the modulation symbols of multiple pieces of uplink data transmitted on the same PUSCH with the MIMO SM, on the basis of the number of spatial-multiplexed sequences notified in advance with the uplink grant to each of the terminal devices 1 and information indicating the precoding to be performed on the sequences.

The decoding unit 3051 decodes the coded bits of the PUCCH and the PUSCH, which have been demodulated, at the coding rate in compliance with a coding scheme prescribed in advance, the coding rate being prescribed in advance or being notified in advance with the uplink grant to the terminal device 1 by the base station device 3 itself, and outputs the decoded uplink data and uplink control information to the higher layer processing unit 101. In a case that the PUSCH is re-transmitted, the decoding unit 3051 performs the decoding with the coded bits input from the higher layer processing unit 301 and retained in an HARQ buffer, and the demodulated coded bits. The channel measurement unit 309 measures the channel estimate, the channel quality, and the like, on the basis of the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the terminal device 1 through the transmit and receive antenna 309.

The coding unit 3071 codes the HARQ indicator, the downlink control information, and the downlink data that are input from the higher layer processing unit 301, in compliance with the coding scheme prescribed in advance, such as block coding, convolutional coding, or turbo coding, or in compliance with the coding scheme determined by the radio resource control unit 3011. The modulation unit 3073 modulates the coded bits input from the coding unit 3071, in compliance with the modulation scheme prescribed in advance, such as BPSK, QPSK, 16 QAM, or 64 QAM, or in compliance with the modulation scheme determined by the radio resource control unit 3011.

The downlink reference signal generation unit 3079 generates, as the downlink reference signal, a sequence that is already known to the terminal device 1 and that is acquired in accordance with a rule prescribed in advance on the basis of the physical layer cell identifier (PCI) for identifying the base station device 3, and the like. The multiplexing unit 3075 multiplexes the modulated modulation symbol of each channel and the generated downlink reference signal. To be more specific, the multiplexing unit 3075 maps the modulated modulation symbol of each channel and the generated downlink reference signal to the resource elements.

The radio transmission unit 3077 performs inverse fast Fourier transform (IFFT) on the modulation symbol resulting from the multiplexing or the like, generates an OFDM symbol, attaches a CP to the generated OFDM symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 309 for transmission.

To be more specific, the terminal device 1 in the present embodiment may include a reception unit 105 receiving higher layer signaling including information to be used to configure a first set of one or more serving cells, and information to be used to configure a first reporting mode, receiving higher layer signaling including information to be used to configure a second set of one or more serving cells, and information to be used to configure a second reporting mode, and receiving a DCI format including a CSI request on a PDCCH, and a transmission unit 107 transmitting CSI for the first set on a PUSCH by using the first reporting mode in a case that a first value is set in a field of the CSI request, and transmitting CSI for the second set on the PUSCH by using the second reporting mode in a case that a second value is set in the field of the CSI request.

The transmission unit 107 may reports CSI for a cell group, the serving cell for which the PUSCH is scheduled belonging to the cell group, using the DCI format including the CSI request. Here, any of the first reporting mode and the second reporting mode may be a mode for reporting CQI calculated assuming transmission on a set S subband.

The base station device 3 in the present embodiment may include a transmission unit 307 transmitting higher layer signaling including information to be used to configure a first set of one or more serving cells, and information to be used to configure a first reporting mode, transmitting higher layer signaling including information to be used to configure a second set of one or more serving cells, and information to be used to configure a second reporting mode, and transmitting a DCI format including a CSI request on a PDCCH, and a reception unit 305 receiving CSI for the first set on a PUSCH by using the first reporting mode in a case that a first value is set in a field of the CSI request, and receiving CSI for the second set on the PUSCH by using the second reporting mode in a case that a second value is set in the field of the CSI request.

The reception unit 305 may receive CSI for a cell group, the serving cell for which the PUSCH is scheduled belonging to the cell group, using the DCI format including the CSI request. Here, any of the first reporting mode and the second reporting mode may be a mode for reporting CQI calculated assuming transmission on a set S subband.

With this configuration, the terminal device can efficiently transmit the uplink control information.

A program running on each of the base station device 3 and the terminal device 1 according to the present invention may be a program that controls a central processing unit (CPU) and the like (a program for causing a computer to operate) in such a manner as to realize the functions according to the above-described embodiment of the present invention. The information handled in these devices is temporarily stored in a random access memory (RAM) while being processed. Thereafter, the information is stored in various types of read only memory (ROM) such as a flash ROM and a hard disk drive (HDD) and when necessary, is read by the CPU to be modified or rewritten.

Moreover, the terminal device 1 and the base station device 3 according to the above-described embodiment may be partially realized by a computer. This configuration may be realized by recording a program for realizing such control functions on a computer-readable recording medium and causing a computer system to read the program recorded on the recording medium for execution.

The "computer system" refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station device 3 according to the above-described embodiments can be realized as an aggregation (a device group) constituted of multiple devices. Devices constituting the device group may be each equipped with some or all portions of each function or each functional block of the base station device 3 according to the above-described embodiment. It is only required that the device group itself include general functions or general functional blocks of the base station device 3. Furthermore, the terminal device 1 according to the above-described embodiments can communicate with the base station device as the aggregation.

Furthermore, the base station device 3 according to the above-described embodiment may be an Evolved Universal Terrestrial Radio Access Network (EUTRAN). Furthermore, the base station device 3 according to the above-described embodiment may have some or all portions of the function of a node higher than an eNodeB.

Furthermore, some or all portions of each of the terminal device 1 and the base station device 3 according to the above-described embodiment may be realized as an LSI that is a typical integrated circuit or may be realized as a chip set. The functional blocks of each of the terminal device 1 and the base station device 3 may be individually realized as a chip, or some or all of the functional blocks may be integrated into a chip. Furthermore, the circuit integration technique is not limited to the LSI, and the integrated circuit may be realized with a dedicated circuit or a general-purpose processor. Furthermore, if with advances in semiconductor technology, a circuit integration technology with which an LSI is replaced appears, it is also possible to use an integrated circuit based on the technology.

Furthermore, according to the above-described embodiment, the terminal device is described as one example of a communication device, but the present invention is not limited to this, and can be applied to a fixed-type or a stationary-type electronic apparatus installed indoors or outdoors, for example, a terminal device or a communication device, such as an audio-video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiment is also included in the technical scope of the present invention.

INDUSTRIAL APPLICABILITY

The present invention can be applied to at least mobile phones, personal computers, tablet computers, and the like.

REFERENCE SIGNS LIST 1 (1A, 1B, 1C) Terminal device
3 Base station device
101 Higher layer processing unit
103 Control unit
105 Reception unit
107 Transmission unit
301 Higher layer processing unit
303 Control unit
305 Reception unit
307 Transmission unit
1011 Radio resource control unit
1013 Scheduling information interpretation unit
1015 Transmit power control unit
3011 Radio resource control unit
3013 Scheduling unit
3015 Transmit power control unit

The invention claimed is:
1. A terminal apparatus comprising:
receiving circuitry configured to receive a downlink control information format which is used for scheduling of a physical uplink shared channel; and
transmitting circuitry configured to perform an aperiodic channel state information reporting using the physical uplink shared channel in a case that a channel state information request field is set to trigger an aperiodic channel state information report, the channel state information request field being included in the downlink control information format, wherein
whether a precoding matrix indicator is included in the aperiodic channel state information reporting or not is determined based on a value of the channel state information request field which is set to trigger the aperiodic channel state information report,
the receiving circuitry is configured to:
receive first information used for configuring whether the precoding matrix indicator is included in the aperiodic channel state information reporting or not for a case where the value of the channel state information request field is set to a first value, and
receive second information used for configuring whether the precoding matrix indicator is included in the aperiodic channel state information reporting or not for a case where the value of the channel state information request field is set to a second value.
2. The terminal apparatus according to claim 1, wherein the aperiodic channel state information reporting is performed by using a mode selected from a group consisting of:
one or more modes in each of which the aperiodic channel state information reporting includes the precoding matrix indicator; and
one or more modes in each of which the aperiodic channel state information reporting includes no precoding matrix indicator,
the mode being determined in accordance with the value of the channel state information request field.
3. A base station apparatus comprising:
transmitting circuitry configured to transmit a downlink control information format which is used for scheduling of a physical uplink shared channel; and
receiving circuitry configured to receive an aperiodic channel state information reporting using the physical uplink shared channel in a case that a channel state information request field is set to trigger an aperiodic channel state information report, the channel state information request field being included in the downlink control information format, wherein
whether a precoding matrix indicator is included in the aperiodic channel state information reporting or not is determined based on a value of the channel state information request field which is set to trigger the aperiodic channel state information report,
the transmitting circuitry is configured to:
transmit first information used for configuring whether the precoding matrix indicator is included in the aperiodic channel state information reporting or not for a case where the value of the channel state information request field is set to a first value, and
transmit second information used for configuring whether the precoding matrix indicator is included in the aperiodic channel state information reporting or not for a case where the value of the channel state information request field is set to a second value.
4. The base station apparatus according to claim 3, wherein
the aperiodic channel state information reporting is performed by using a mode selected from a group consisting of:
one or more modes in each of which the aperiodic channel state information reporting includes the precoding matrix indicator; and
one or more modes in each of which the aperiodic channel state information reporting includes no precoding matrix indicator, the mode being determined in accordance with the value of the channel state information request field.

5. A communication method of a terminal apparatus comprising:
receiving a downlink control information format which is used for scheduling of a physical uplink shared channel;
performing an aperiodic channel state information reporting using the physical uplink shared channel in a case that a channel state information request field is set to trigger an aperiodic channel state information report, the channel state information request field being included in the downlink control information format;
receiving first information used for configuring whether the precoding matrix indicator is included in the aperiodic channel state information reporting or not for a case where the value of the channel state information request field is set to a first value; and
receiving second information used for configuring whether the precoding matrix indicator is included in the aperiodic channel state information reporting or not for a case where the value of the channel state information request field is set to a second value,
wherein
whether a precoding matrix indicator is included in the aperiodic channel state information reporting or not is determined based on a value of the channel state information request field which is set to trigger the aperiodic channel state information report.

6. The communication method according to claim 5, wherein
the aperiodic channel state information reporting is performed by using a mode selected from a group consisting of:
one or more modes in each of which the aperiodic channel state information reporting includes the precoding matrix indicator; and
one or more modes in each of which the aperiodic channel state information reporting includes no precoding matrix indicator,
the mode being determined in accordance with the value of the channel state information request field.

7. A communication method of a base station apparatus comprising:
transmitting a downlink control information format which is used for scheduling of a physical uplink shared channel;
receiving an aperiodic channel state information reporting using the physical uplink shared channel in a case that a channel state information request field is set to trigger an aperiodic channel state information report, the channel state information request field being included in the downlink control information format;
transmitting first information used for configuring whether the precoding matrix indicator is included in the aperiodic channel state information reporting or not for a case where the value of the channel state information request field is set to a first value; and
transmitting second information used for configuring whether the precoding matrix indicator is included in the aperiodic channel state information reporting or not for a case where the value of the channel state information request field is set to a second value,
wherein
whether a precoding matrix indicator is included in the aperiodic channel state information reporting or not is determined based on a value of the channel state information request field which is set to trigger the aperiodic channel state information report.

8. The communication method according to claim 7, wherein
the aperiodic channel state information reporting is performed by using a mode selected from a group consisting of:
one or more modes in each of which the aperiodic channel state information reporting includes the precoding matrix indicator; and
one or more modes in each of which the aperiodic channel state information reporting includes no precoding matrix indicator,
the mode being determined in accordance with the value of the channel state information request field.

* * * * *